(12) United States Patent
Huang et al.

(10) Patent No.: US 6,608,815 B1
(45) Date of Patent: Aug. 19, 2003

(54) METHOD AND APPARATUS FOR CONNECTION ADMISSION CONTROL IN CELL OR PACKET-BASED NETWORKS

(75) Inventors: Jun Huang, Ottawa (CA); Fengchun Duan, Irving, TX (US)

(73) Assignee: Spacebridge Networks Corporation, Hull (CA)

( * ) Notice: Subject to any disclaimer, the term of this patent is extended or adjusted under 35 U.S.C. 154(b) by 0 days.

(21) Appl. No.: 09/435,553

(22) Filed: Nov. 8, 1999

(30) Foreign Application Priority Data

Aug. 5, 1999 (CA) .............................. 2279652

(51) Int. Cl.[7] .............................. H04J 1/16; H04J 3/14; H04L 1/00; H04L 12/26
(52) U.S. Cl. ........................................ 370/232; 370/230
(58) Field of Search ................................ 370/253, 233, 370/230, 229, 236, 230.1, 232, 234, 410, 395.61, 395.43, 395.21, 395.2

(56) References Cited

U.S. PATENT DOCUMENTS

| | | | |
|---|---|---|---|
| 5,267,232 A | | 11/1993 | Katsube et al. |
| 5,341,366 A | | 8/1994 | Soumiya et al. |
| 5,691,975 A | * | 11/1997 | Hamada et al. .............. 370/232 |
| 5,862,126 A | | 1/1999 | Shah et al. |
| 5,917,804 A | * | 6/1999 | Shah et al. .................. 370/230 |
| 6,046,981 A | * | 4/2000 | Ramamurthy et al. ....... 370/232 |
| 6,072,773 A | * | 6/2000 | Fichou et al. ................ 370/230 |
| 6,314,085 B1 | * | 11/2001 | Saranka ........................ 370/230 |
| 6,377,549 B1 | * | 4/2002 | Ngo et al. .................... 370/233 |
| 6,459,681 B1 | * | 10/2002 | Oliva ........................... 370/232 |

FOREIGN PATENT DOCUMENTS

| | | |
|---|---|---|
| CA | 2208096 | 6/1997 |
| CA | 2230633 | 2/1998 |
| CA | 2249069 | 9/1998 |

OTHER PUBLICATIONS

Jun Huang et al., "A Remedy for Mystic Self–Similar Syndrome," Version 5.0 (Jun. 4th, 1999), pp. 1–14, White-Paper 1999, SpaceBridge—a NewBridge/ComDev company.

Harry G. Perros and Khaled M. Elsayed, "Call Admission Control Schemes: A Review," *IEEE Communications Magazine*, Nov. 1996, pp. 82–91.

Mehrvar, H.R. et al., "Estimation of Degree of Self–Similarity for Traffic Control in Broadband Satellite Communications," *CCECE'95*, Montreal, Sep. 5–8, (1995), pp. 515–518.

I. Norros, "On the use of Fractional Brownian Motion in the Theory of Connectionless Networks," *JSAC*, vol. 13, No. 6, 1995, pp. 953–962.

Huang, Jun, ATM User–Network Interface Specification, Version 3.0, PTR Prentice Hall.

R.J. Gibbens and P.J. Hunt, "Effective Bandwidths for the Multi–type UAS channel," *Queueing Systems* 9, 1991, pp. 17–27.

A.G. Greeberg, R. Srikant, W. Whitt, "Resource Sharing for Book–Ahead and Instantaneous–Request Calls," *IEEE/ACM Trans. On NetworkingUU*, pp. 10–22, Feb. 1999.

Y. Chen et al., "A Model for Self–Similar Ethernet Lan Traffic: Design, Implementation, and Performance Implications," *University of Saskatchewan, Dept. of Computer Science, working paper*, 1997, 7 pages.

* cited by examiner

*Primary Examiner*—Wellington Chin
*Assistant Examiner*—Jamal A. Fox
(74) *Attorney, Agent, or Firm*—Drinker Biddle & Reath LLP

(57) ABSTRACT

A cell or packet-based Connection Admission Control (CAC) solution is provided for transmitting Protocol Data Units (PDU) such as Asynchronous Transfer Mode (ATM) user cells or Internet Protocol integrated and differentiated service packets. The CAC method and apparatus allocate network resources including user cell/packet transferring bandwidth in the channel/connection/flow set-up phase. The calculation of Effective Bandwidth is implemented in hardware using an additive-Fractal and measurement-based approach to shorten the processing time and to increase overall system reliability and efficiency.

22 Claims, 14 Drawing Sheets

METHOD AND APPARATUS FOR CONNECTION ADMISSION CONTROL IN CELL OR PACKET-BASED NETWORKS

FIELD OF INVENTION

The present invention relates to the Connection Admission Control (CAC) finctions in a broadband Integrated Service Digital Network (TSDN) using cell/packet-based technologies of, either Asynchronous Transfer Mode (ATM) switch designs for both satellite and terrestrial applications, or new Internet Protocol (IP) router designs with Grade or Service (GoS) concepts such as differentiated service or Multi-Protocol Label Switching (MPLS) architectures.

BACKGROUND OF THE INVENTION

New generations of broadband ISDN technologies that integrate many of the communications services required by the user (i.e., voice, data, moving images, etc.) have recently emerged in communications networks. Information from a large number of calls is transported via fixed-sized packets (or cells in ATM terminology) and then multiplexed onto a single medium whose capacity (in bits per second) is either expressed in a physical size (i.e, link capacity) or a virtual quantity (i.e. effective bandwidth allocation). At connection set-up, the user declares a set of traffic parameters and a required Quality of Service (QoS) from which the carrier must decide whether or not it is possible to establish a path of sufficient bandwidth between the sender and receiver that will satisfactorily accommodate the user's requirement, Connection Admission Control (CAC) is the traffic control function within the network that performs this decision CAC typically depends on a resource allocation algorithm that determines if there are sufficient network resources (including bandwidth and buffer memory) throughout the communication path. In the event of insufficient resources the connection is denied.

Several prior art CAC models have been developed for determining solutions to the effective bandwidth (or effective cell rate) in large network traffic, however the software implementation of these algorithms has generally been too complicated to meet the real-time requirement for the bandwidth solution and the CAC "go/no-go" decision. In order to reduce computation time, many network designers have resorted to simplified approximations such as the "on-off" fluid flow approximation used in U.S. Pat. Nos. 5,862,126 and 5,917,804 (Shah et al, Jan. 19, 1999 and Jun. 29, 1999). Others have chosen empirical models such as the fuzzy logic decisions used in U.S. Pat. No. 5,341,366 (Soumiya et al, Aug. 23, 1994), and the methods for controlling priority levels in both U.S. Pat. No. 5,267,232 (Katsube et al, Nov. 30, 1992), and Canadian Patent Application No. 2,208,096 (M. Aida, Dec. 18, 1997). The bandwidth solutions developed in all of the known prior art CAC models, whether complex solutions or simplified approximations, are implemented in software only.

Other prior art schemes are described in references [1] to [7] listed at the end of this section. All such schemes are relatively complex in one or more of the following aspects (a) Computation Speed The CAC algorithms described in references [1], [3] and [5] are too complicated for real-time applications, such as: Terabit switch/router designs or Low Earth Orbiting satellite access/switching applications, where a relatively large amount of connections need to be processed or handed-off within a few seconds. In such real-time applications, a faster low-level CAC method that would be more suitable for hardware implementation is desirable.

(b) Robustness

When the network is down for some reason, the CAC solutions described in references [1], [3] and [5] may not offer sufficient robustness to recover the same connection on a link due to their complicated method for calculating the effective cell rate (ECR).

(c) Flexibility

As the Internet market grows, major carriers are paying more and more attention to fractal (self-similar) traffic, in addition to the non-self-similar traffic. References [1] and [5] describe a CAC implementation for non-self-similar cases only. Reference [3] describes a case for a self-similar application, however, neither this reference nor any other known report has described the implementation of self-similar cases. Given that data and video traffics are self-similar in nature, as shown in reference [3], and that these traffics are expanding at a considerable pace, there is clearly a need for a CAC implementation that handles both self-similar and non-self-similar traffic at the same time.

(d) Reliability

Careless (or malicious) users may, inadvertently or deliberately, provide a set of traffic parameter values that could render a complicated CAC algorithms invalid, possibly causing the processor performing the computation to crash. In this respect, the complexity of the CAC solutions as described in references [1], [3] and [5] may not permit the system to be sufficiently reliable for mission-critical applications such as telebanking and telemedicine.

(e) Accuracy

The Average Burst Size (ABS) is a traffic parameter that neither the ATM Forum Specifications described in reference [4], nor other known prior art CAC solutions have taken into account. Conventional CAC methods assume that the ABS and the Maximum Burst Size (MBS) are relatively the same, which is not accurate. As a result of this assumption, present CAC solutions based solely on the input descriptor MBS tend to over-estimate the effective bandwidth, leading to low bandwidth and buffer efficiency. It is desirable to have a CAC implementation that takes both ABS and MBS into account to more effectively remedy this problem.

(f) Automation

Existing CAC solutions such as those described in references [1] and [5] rely on complementary manual tuning of the CAC formula by a trained network operator. This manual operation is not a cost-effective approach to network management. It is therefore desirable to have a more cost-effective self-tuned CAC implementation.

Prior Art References

[1] Harry G. Perros and Khaled M. Elsayed, "Call Admission Control Schemes: A Review," *IEEE Communications Magazine*, November 1996.

[2] Mehrvar, H. R. and Le-Ngoc, T., "Estimation of Degree of Self-Similarity for Traffic Control in Broadband Satellite Communications," *CCECE'95*, Montreal, September 5–8, (1995).

[3] I. Norros, "On the use of Fractional Brownian Motion in the Theory of Connectionless Networks," *JSAC*, Vol. 13, No. 6, 1995, pp. 953–962.

[4] ATM Forum, *UNI3.0 Specification*, 1993.

[5] R. J. Gibbens and P. J. Hunt, "Effective Bandwidths for the Multi-type UAS. Channels" *Queueing Systems* 9, 1991, pp. 17–28.

[6] A. G. Greeberg, R. Srikant, W. Whitt, "Resource Sharing for Book-Ahead and Instantaneous-Request Calls" *IEEE/ACM Trans. On Networking*, pp. 10–pp22, February, 1999.

[7] Y. Chen, Z. Deng, and C. L. Williamson, "A Model for Self-Similar Ethernet LAN Traffic: Design, Implementation and Performance Implementations", *University of Saskatchewan, Dept. of Computer Science, working paper*, 1997.

SUMMARY OF THE INVENTION

It is an object of the present invention to provide an improved apparatus and method for Connection Admission Control (CAC) solution, that solves the self-similar implementation problem in order to satisfy both fractal (self-similar) and non-self-similar traffic requirements in emerging broadband ISDN networks, such as virtual satellite networks and new internet protocol designs.

It is another object of the invention to simplify and reduce the mathematical calculations of the CAC solution, thereby minimizing the computational time to allow for a real-time implementation.

It is a further object of the invention to provide a minimum hardware implementation of the CAC solution that uses logarithmic operations in a pure additive/subtractive process to speed up the CAC computation at a real-time rate unmatched by traditional software approaches.

It is another object of the invention to provide a hardware implementation that permits the recovery of traffic connection in case of a link failure.

It is another object of the invention to detect, measure and calculate the Average Burst Size (ABS) and the Hurst value for each applicable service class in order to avoid overestimation (which wastes system resources) or underestimation (which jeopardizes the system performance).

It is a further object of the invention to provide automated measurements when deriving the CAC solutions in order to resolve the inefficiencies associated with manual operation.

To achieve the above objectives of the present invention, there is provided a cell or packet-based CAC method and apparatus for calculating the effective bandwidth in large network traffic that uses either ATM switches for both satellite and terrestrial applications or new Internal Protocol (IP) router designs with GoS concepts such as differentiated services or Multi-Protocol Label Switching (MPLS) architecture. The invention provides a real-time hardware implementation of CAC that satisfies the complex Effective Bandwidth equations for both self-similar and non-self-similar traffics. The invention provides a minimum hardware implementation that uses logarithmic principles in a pure additive formula to speed up the complex CAC computation and provide near real-time solutions that are unmatched by traditional software designs.

In accordance with an aspect of the present invention there is provided a system for Call Admission Control (CAC) within a data network for a new call having a class of service, said system comprising:

a) means for periodically obtaining from said data network data flow information and a set of parameter values corresponding to a set of network resource parameters;

b) a Hurst meter block for determining Hurst parameter (H) value from the data flow information based on the class of service;

c) a TF block for determining a Tuning Factor (TF) value from the data flow information;

d) an ECR calculator block responsive to the Hurst meter block and the TF block for determining an Effective Cell Rate (ECR) value;

e) an accumulator block responsive to the ECR calculator block for estimating required Total Effective Cell Rate (TECR) value;

f) a BF block for determining a Reference Effective Cell Rate (RECR) value from the data flow information and the set of parameter values; and g) a comparator block responsive to the accumulator block and the BF block for comparing the values of TECR and RECR and providing a go-no-go sign indicating that the new call is to be accepted when TECR<RECR, and that the new call is to be rejected otherwise;

wherein the value of TECR is updated within the accumulator block when the new call is accepted.

The set of network resource parameters includes buffer size (BS), peak cell rate (PCR), sustainable cell rate (SCR), and user specified Cell Loss Ratio (CLRs) corresponding to the class of service.

In an embodiment of the present invention, the ECR calculator block determines the ECR value by first extracting a Maximum Burst Size (MBS) value from the data flow information, and then using the formula of:

$$ECR = SCR/[CLRs\ (SCPR/PCR)]^{MBS/(BS/TF)/(2-2H)}$$

To perform the calculations for this formula, the ECR calculator block includes a hardware circuit having a multiplier, an exponentiator and a plurality of dividers for calculating the ECR value.

In a preferred embodiment, the ECR calculator block calculates the ECR value by first extracting a Maximum Burst Size (MBS) value from the data flow information, and then using the formula of:

$$\text{Log } ECR = \text{Log } SCR - [\text{Log } CLR + \text{Log } SCR - \text{Log } PCR] \times \text{Exponent}$$

where Exponent=$[MBS/(BS/TF)]/(2-2H)$.

To perform the calculations for this formula, the ECR calculator block includes a hardware circuit having a plurality of subtractors, adders, log tables, and an anti-log table for calculating the ECR value in a plurality of logarithmic operations. At least one of the plurality of log tables is preceded by a multiplexer and succeeded by a demultiplexer to permit sharing of said table among a plurality of logarithmic operations.

In yet another embodiment, the set of resource parameters includes link capacity (LC) and user specified Cell Loss Ratio (CLRs), and wherein the BF block determines the RECR value by setting a booking factor (BF) value, and calculating RECR as LC/BF. The BF block derives from the data flow information a measured Cell Loss Ratio (CLRm) value by dividing the number of discarded cells over the number of transferred cells, and then compares the values of CLRm and CLRs, such that the BF value is decreased when CLRm<CLRs, and increased when CLRm>CLRs. The BF block sets a predetermined upper bound for the BF value such that when the BF value reaches the upper bound, an incremental increase in buffer threshold is effected for said class of service. In this same embodiment, the T7 block determines the TF value by deriving an Average Burst Size (ABS) value and extracting a Maximum Burst Size (MBS) value from the data flow information based on the class of service, and then calculating the TF value as ABS/MBS for each applicable class of service The Hurst meter block sets the value of H to 0.5 for non-self similar traffic. The accumulator block estimates the TECR value by keeping track of calls released and calls to be accepted by the data network.

In another embodiment, the CAC system further comprising an ECR recovery block for updating the TECR value within the accumulator block upon recovery from an interrupted connection.

In another aspect of the present invention, there is provides a method of Call Admission Control (CAC) within a data network for a new call having a class of service, said method comprising the steps of:

a) periodically obtaining from said, data network data flow information and a set of network parameter values corresponding to a set of resource parameters;

b) determining a Hurst parameter (T) value;

c) determining a Tuning Factor (TF) value, d) determining an Effective Cell Rate (ECR) value;

e) estimating a required Total Effective Cell Rate (TECR) value;

f) determining a Reference Effective Cell Rate (RECR) value;

g) comparing the values of TECR and RECR such that the new call is to be accepted when TECR<RECR, and the new call is to be rejected otherwise;

h) updating the value of TECR when the new call is accepted.

The set of network resource parameters includes buffer size (BS), peak cell rate (PCR), sustainable cell rate (SCR), and user specified Cell Loss Ratio (CLRs) corresponding to the class of service. The H value is determined from the class of service and data flow information. The ECR value is determined by using the H value, the TF value and said set of resource parameters.

In an embodiment of this invention, the step of determining the ECR value includes the steps of:

(i) exacting a Maximums Burst Size (MBS) value from the data flow information; and (ii) calculating the ECR value by using the formula of:

$$ECR = SCR/[CLRs\ (SCR/PCR)]^{MBS/(BS/TF)/(2-2H)}$$

In another embodiment of this invention, the step of determining the ECR value includes the steps of:

(i) extracting a Maximum Burst Size (MBS) value from the data flow information; and (ii) calculating the ECR value by using the formula of:

$$\text{Log } ECR = \text{Log } SCR - [\text{Log } CLR + \text{Log } SCR - \text{Log } SCR] \times \text{Exponent}$$

where Exponent=$[MBS/(BS/TF)]/(2-2H)$.

In yet another embodiment of this invention, the set of resource parameters includes link capacity (LC) and user specified Cell Loss Ratio (CLRs), wherein the step of determining the RECR value includes the steps of:

(i) setting a booking factor (BF) value; and (ii) calculating RECR as LC/BF.

The step of setting the BF value includes the steps of:

(i) deriving from the data flow information a measured Cell Loss Ratio (CLRm) value as the number of discarded cells over the number of transferred cells; and (ii) comparing the values of CLRm and CLRs, such that the BF value is decreased when CLRm<CLRs, and increased when CLRm>CLRs.

A predetermined upper bound is set for the BF value such that when the BF value reaches the upper bound, an incremental increase in buffer threshold is effected for said class of service.

The step of determining the TF value includes the steps of:

(i) deriving an Average Burst Size (ABS) value and extracting a Maximum Burst Size (MBS) value from the data flow information based on the class of service; and (ii) calculating the TF value as ABS/MBS for each applicable class of service. The value of H is set to 0.5 for non-self similar traffic.

The step of estimating TECR is performed by keeping track of calls released and calls to be accepted by the data network. This TECR value is updated upon recovery from an interrupted connection.

Prior art methods for calculating the Effective Bandwidth (EB) are typically complicated, computationally difficult, and depend greatly on mathematical assumptions Yet, the operator in the field is still required to manually adjust the CAC to meet the real traffic situation as traffic profiles evolve, rendering the sophisticated calculations non-useful. The present invention overcomes this problem by offering a simple, "back-to-basics", self-tuned hardware CAC implementation that needs little or no manual in the field.

Advantages of the present invention over prior art include a considerable increase in computational speed, flexibility in implementing the complex formula for both self-similar and non-self-similar traffic, increased accuracy by taking both the ABS and MBS factors into account, increased reliability for mission-critical applications, robustness in recovering connection in case of a link failure, and a more cost-effective automated approach to resolving the inefficiencies associated with manual operation.

In a cell/packet based network, including ATM and IP networks for all service categories that transmit Data Units, each ATM switch or IP router must allocate enough bandwidth and buffer to guarantee that the required QoS for each virtual channel (or GoS for each flow) will be satisfied. As a preventive mechanism for network congestion, CAC is performed at connection (or flow) set-up time to determine if the new connection (or flow) can be accepted in terms of both its own service requirements and any impact it may have on already existing connections (or flows). Logically the "go/no-go" decision of the CAC function must be performed for each statistical element of the network. For example, in satellite environments these elements include the transmitting queue in the ground terminal, the up-link ingress queue, the fabric queue, the down-link queue is in the on-board switch, and the receiving queue in the ground terminal. For each of these elements, a CAC engine can be implemented.

For convenience, a glossary of acronyms used in this description is given below.

ABR Available Bit Rate
ABS Average Burst Size
ATM Asynchronous Transfer Mode
BF Booking Factor
BFBS Buffer with Factor scaled Size
BS Buffer Size
CAC Connection Admission Control
CBR Continuous Bit Rate
CFI Cell (or data) Flow Information
CLR Cell Loss Ratio
CLRm Measured value of Cell Loss Ratio
CLRs User Specified Cell Loss Ratio
CoS Class of Service EB Effective (or equivalent) Bandwidth
ECR Effective Cell Rate
GFR Guaranteed Frame Rate
GoS Grade of Service
H Hurst parameter
HST Hurst Smoothness of Traffic
IP Internet Protocol
LC Link Capacity
MBS Maximum Burst Size
MIB Management Information Base
PCR Peak Cell Rate
QoS Quality of Service
RECR Reference Effective Cell Rate
SCR Sustainable Cell Rate
TECR Total Effective Cell Rate
TF Tuning Factor
UBR Unspecified Bit Rate
VBR Variable Bit Rate

BRIEF DESCRIPTION OF THE FIGURES

Exemplary embodiments of the invention will now be further described with references to the drawings in which same reference numerals designate similar parts throughout the figures thereof, and wherein.

Figure 1:
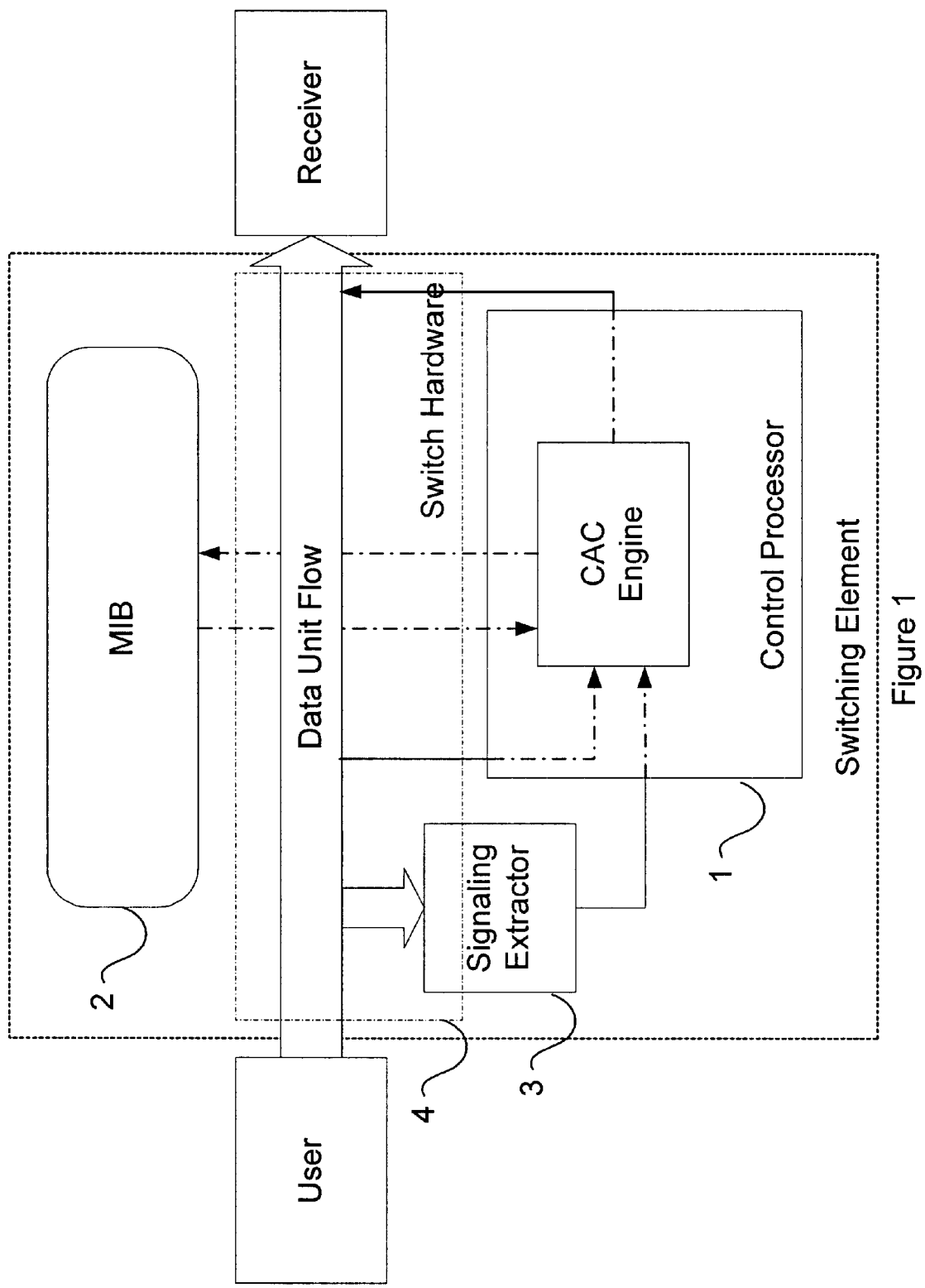
FIG. 1 illustrates, in a block diagram, a typical switching element that incorporates a CAC engine.

Table 1 compares the number of mathematical operations in this invention relative to prior art solutions;

Table 2 compares the calculated ECR values in this invention relative to the prior art;

Table 3 shows information requited in the MNB for different Service Categories and Classes;

Table 4 shows additional data required in the MIB for different Service Categories and Classes; and Table 5 compares simulated CLR values with analyzed CLR values for different Hurst parameter values.

DETAILED DESCRIPTION OF THE INVENTION

1. Terminology

Throughout is description the following terms are used in accordance with their respective definitions given below.

| | |
|---|---|
| Data Unit: | A Protocol Data Unit (PDU), e.g. an ATM user cell or an IP user packet |
| Data Network: | A cell/packet network, e.g. ATM or IP networks for serially transmitting data units |
| Network Element: | ATM switch or IP router |
| Network Performance: | Quality of Service for each Virtual Channel (VC) or Grade of Service (GoS) for each flow that is to be admitted |
| Effective Bandwidth: | Effective cell rate (cells/second) or data rate (bytes/second) |
| Traffic Characteristics: | The burstiness or the intensity of traffic fluctuation including ABS and Hurst parameter H |
| Fractal (self-similar) traffic: | A traffic pattern whose parts are similar to the whole in certain aspects, irrespective of the time period. |

Throughout, the term cell is used to imply the general meaning of a data unit as defined above, which is applicable to any type of data network as defined above. Also, the two terms bandwidth and cell rate are interchangeably used to imply the general meaning of the rate of data flow within any type of data network as defined above.

2. Configuration of the Call Admission Control (CAC) Engine

Before describing alternative embodiments of the present invention, the following explains the derivation of formulas for calculating the Effective (or equivalent) Bandwidth (EB), expressed in Effective Cell Rate (ECR) in cells/second.

First, a relatively simple formula for calculating ECR, is obtained from a Markovian (M/M/1) queue model as:

$$ECR = BF \times SCR/(CLR \times SCR/PCR)^{(MBS \times TF/BS)}$$

where BS is the buffer size for a theoretical queue, IMS is the maximum burst size, TF is the tuning factor and BRF is the booking factor. The parameters CLR (Cell Loss Ratio), SCR (Sustainable Cell Rate), and PCR (Peak Cell Rate) are resource parameters, the values of which are obtained from the user system. The CLR parameter is the ratio of the number of cells discarded within a user's data switch over the number of cells entered into the switch during a specified period of time. The Tuning Factor and Booking Factor are used to adjust the aggressiveness of the calculation. The switch vendor provides the initial default values, while the operational values are to be tuned in the field. In most cases, these values are left untouched in the field unless the network operator wants to override the settings.

A buffer is physically located in each statistical multiplexing element of the data network where the CAC functions are executed. For example, in satellite communications these elements include the transmitting queue in the ground terminal, the up-link ingress queue, the fabric queue, the down link queue in the on-board switch, and the receiving queue in the ground terminal. Within such a buffer, different Classes of Service (CoS) have different traffic characteristics. For example, a Constant Bit Rate (CBR) service has a relatively smooth traffic with an almost fixed rate, and thus requires a smaller buffer space than a Variable Bit Rate (VBR) service having by traffic. In the extreme case where the VBR service sends its cells at a maximum line rate followed by a quiet period during which no cells are sent, a relatively large buffer space is required. The ATM Forum has defined a number of different classes of service CoS, as documented in reference [4] In order to accommodate such different classes, the total buffer space has to be partitioned among these classes. It should be noted that, since the CAC functions have to be performed for each service class of queues, in actual practice the theoretical Buffer Size (BS) corresponds to the buffer threshold for each service class.

Based on the above M/M/1 queue formula and using a wavelet-like method, a simple Effective Bandwidth (EB) formula for a self-similar (i.e. fractal) traffic is further derived from a Fractional Brownian Motion (FBM/M/1) queue model as per the following.

The multiplexing of a large number of connections in a network is modelled from a fundamental FBM/M/1 queue in order to derive the following formula for calculating the Cell Loss Ratio after applying simple approximations:

$$CLR \cong (SCR/EB)^{(BS/AB) \times (2-2H)}$$

where (BS/ABS) is the equivalent number of cells in the queuing system, and H is the Hurst parameter obtained from statistical measurements for applicable traffic containing specific service and traffic parameters. In theory, the value for H value ranges from 0.5 to 0.99, depending on the type of traffic. In practice, H typically ranges from 0.7 to 0.9 for self-similar traffic and has a value of 0.5 for non-self-similar traffic.

When the number of connections is not too large, the aggregate traffic may not be as smooth as a Poisson distribution. Therefore the burstiness ratio (PCR/SCR) should be taken into account when calculating the CLR value. Since this ratio is proportional to the traffic burstiness, an approximate expression for the above CLR equation is then expressed as:

$$CLR \cong (PCR/SCR) \times (SCR) \times (SCR/EB)^{(BS/ABS) \times (2-2H)}$$

Solving for the unknown EB, we get $$EB \text{ (or } ECR) = SCR/[CLR \times (SCR/PCR)]^{(ABS/BS)/(2-2H)}$$

Since ABS/MBS=TF, then ABS/BS=[TF×(MBS/BS)], and $$ECR = SCR/[CLR \times SCP/PCR]^{(TF \times MBS/BS)/(2-2H)}$$

Since BFS=BS/TF and HST=2−2H, the ECR formula can also be expressed as $$ECR = SCR/[CLR \times SCR/PCR]^{(MBS/BFS)/(HST)}$$

The last two formulas are the ones mainly used in calculating the CLR value in alternative embodiments of this invention, the former in embodiments using logarithmic operations and the latter in embodiments using direct mathematical operations, as will be described further below.

It should be noted that the above two formulas are also applicable for Multi-Protocol Label Switching (MPLS) being developed for future applications, except that the traffic units would be in bytes/second instead of cells/second, and the MBS would correspond to the maximum packet size.

FIG. 1 is a top-level block diagram showing a typical switching element that incorporates a CAC engine which physically resides and operates within a real-time control processor 1 and logically sits between the user and network interface, interacting with the software part of a signaling and Management Information Base (MIB) 2 of the switch. In addition to performing CAC functions, the real-time processor 1 computes and processes top level calls and interactions between all of the elements. The MIB 2 records all call processes related to the system and traffic parameters. A signaling extractor 3 extracts relevant traffic parameters from the data unit flow during the call set-up phase. The switch hardware 4 is the physical board where data unit flow is processed. The data unit flow terminates at a receiver.

Figure 2:
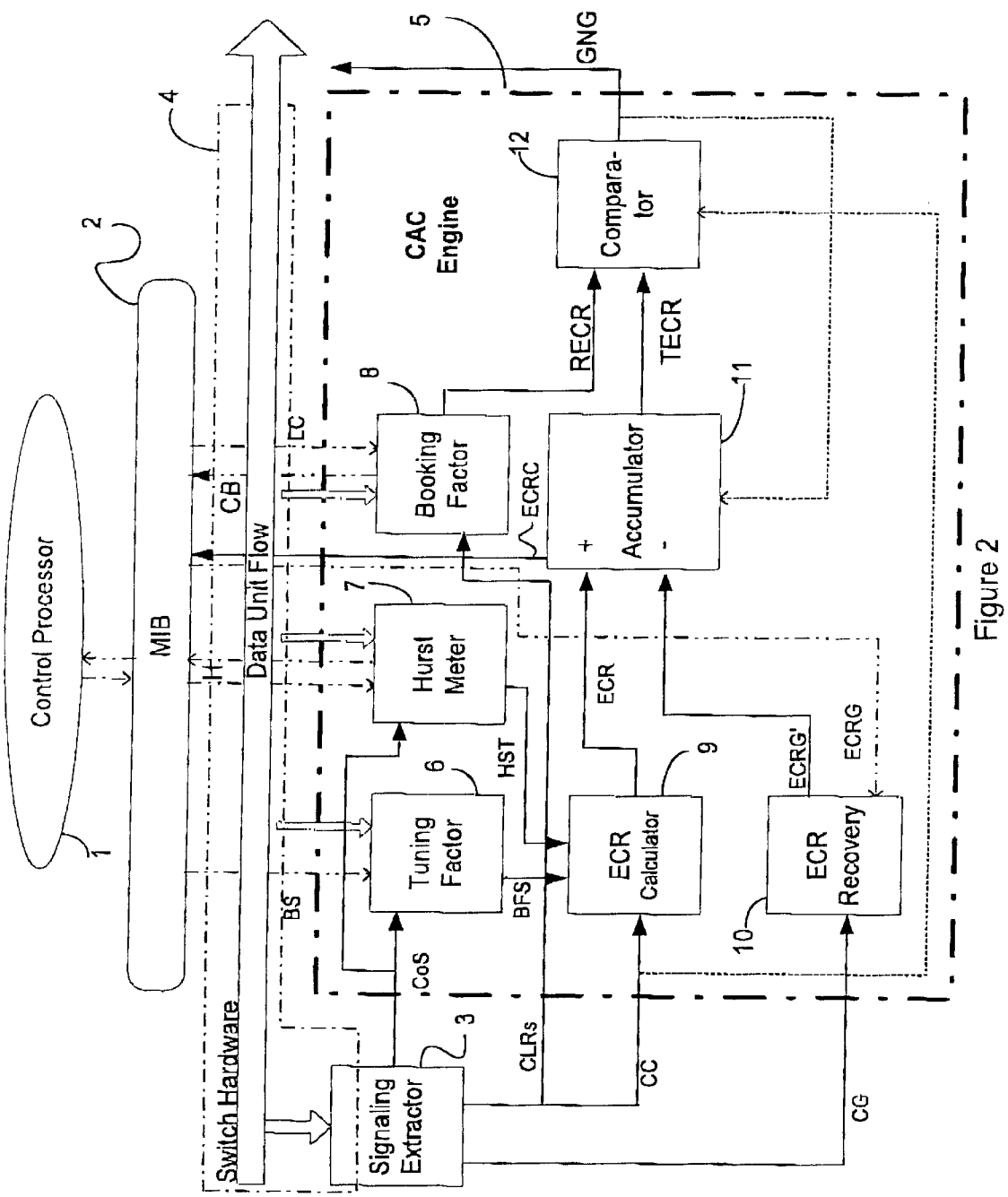
FIG. 2 illustrates, in a block diagram, the composition of the CAC engine in accordance with an embodiment of this invention and its interconnection with the switching hardware and other elements of the network.

FIG. 2 is a block diagram illustrating a CAC engine 5 in accordance with an embodiment of the present invention. This figure also shows the relationship among the CAC engine 5, the switch hardware 4, the MIB 2 and the control processor 1. The Signaling Extractor 3 provides CAC engine 5 the following traffic and network information from an analysis of the data unit flow in switch hardware 4 and from the remainder of the data network:

1. from the switch hardware 4: Cell Flow Information (CFI), which is used by the CAC engine 5 to obtain the Average Burst Size (ABS) and the maximum burst size (MBS);
2. from the MIB 2: the Hurst parameter (H), the Link Capacity (LC) and the Buffer Size (BS); and
3. from the signaling extractor 3: the Peak Cell Rate (PCR), the Sustainable Cell Rate (SCR), the Quality of Service (QoS), a user specified value of the Cell Loss Ratio (CLRs), the Class of Service (CoS), the Call__Goes signal (CG) and the Call__Comes signal (CC).

Within the thick dotted lines of FIG. 2, the CAC engine 5 contains the following blocks: a Tuning Factor (TF) block 6, a Hurst meter block 7, a Booking Factor (BF) block 8, an ECR calculator block 9, an ECR recovery block 10, an accumulator block 11, and a comparator block 12. The following is a functional description of each of the above blocks and their interaction with one another and with the remainder of the switching system shown in FIG. 2.

(a) Booking Factor (BF) Block

Figure 3:
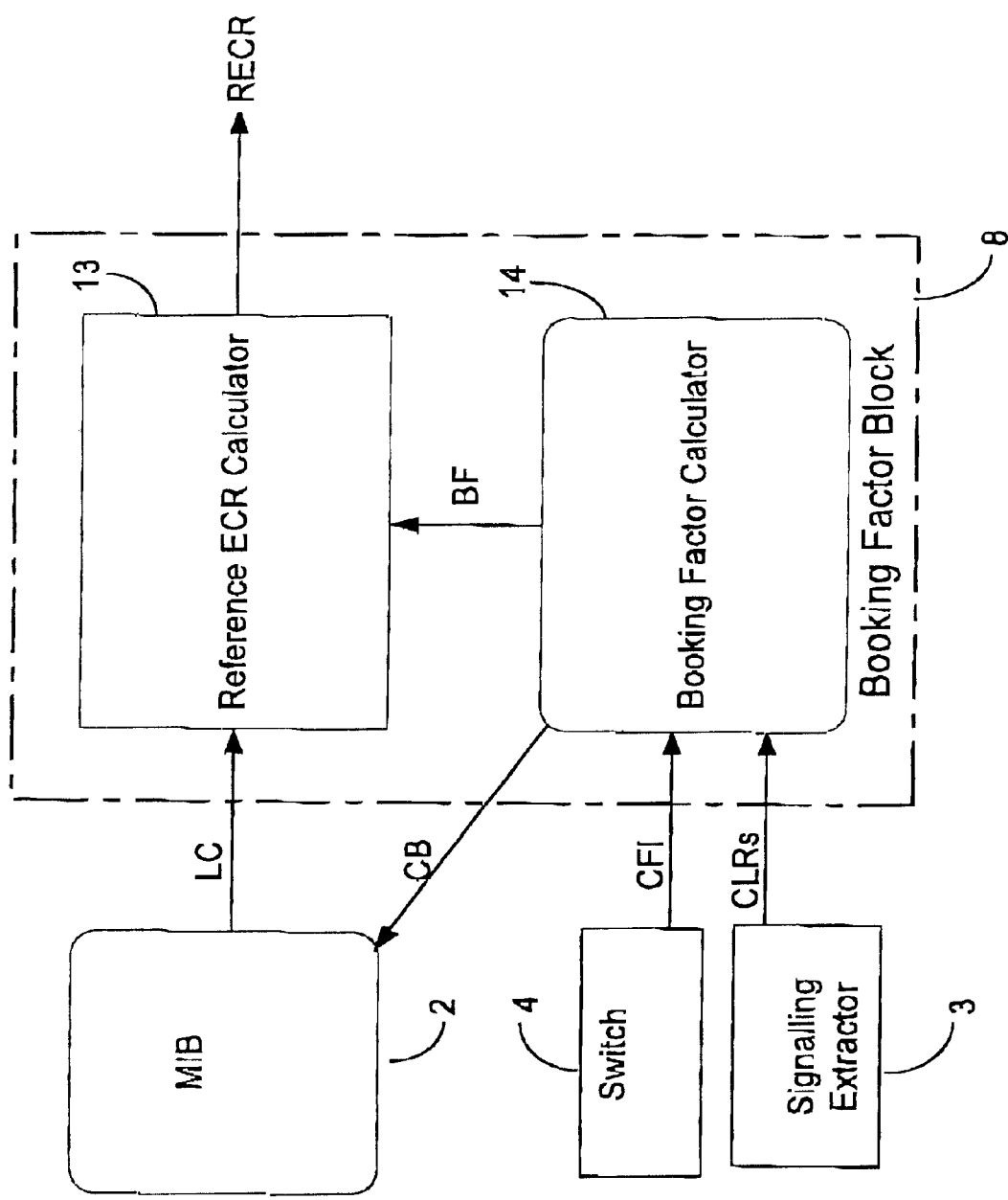
FIG. 3 illustrates, in a block diagram, the booking factor block shown in FIG. 2.

Further details of the BF block 8 are illustrated in FIG. 3. As indicated above, the Booking Factor is used to adjust the aggressiveness of the calculation. The switch vendor provides the initial default values, while the real values are tuned automatically in the field. In most cases, these values are left untouched in the field unless the network operator wants to override the settings.

The BF block 8 contains a Booking Factor (BF) calculator 14, which provides the BF value to a reference ECR calculator 13, within the BF block 8. The BF Calculator 14 fetches the CLRs value from the signaling extractor 3 and the data flow information, expressed for this embodiment as Cell Flow Information (CFI), from the switch hardware 4. A set of counters for each service class in the switch hardware 4 record the number of cells discarded within the switch and the number entered into the switch during, a specified period. The BF calculator 14 then derives from the CFI the measured value of CLR (CLRm) as the ratio of the number of discarded cells over the number of entered cells, and calculates the BF value from the CLRs and CLRm values. If CLRm is less than CLRs, the BF calculator 14 decreases the BF by a pre-defined amount, typically 0.1. On the other hand, if CLRm is greater than CLU, the BF value is increased by the same predefined amount. Otherwise the BF value remains the same. The value of BF typically ranges from a lower bound of 0.1 and an upper bound of as high as 10. If the upper bound is reached but still does not meet the required CLRS, then the BF calculator 14 will send a Change Buffer (CB) signal to the MIB 2 in order to increase the buffer threshold corresponding to the Class of Service (CoS) of the call in progress.

The buffer threshold value of the particular CoS refers to the amount of the buffer space that is allocated to that CoS. Thus it corresponds to the buffer size that such CoS can actually account on Typically a CBR service has a lower threshold than a VBR service. These thresholds are configurable. The threshold value for each class is stored in the MIB 2. When the BF calculator 14 updates these values in the MIB 2, the statistical element in the data network will reallocate the buffer space among the classes concerned. As the total buffer is fixed at the time of manufacture, such a change in threshold setting will undesirably decrease the buffer threshold of the next lower CoS by a pre-defined configuration setting (typically 10 cells at a step). However, such a decrease is only expected when the traffic profile encounters major changes.

In some cases, laboratory or field measurements indicate that a theoretically calculated threshold is too low, i.e. not enough buffer space is allocated to a VBR class of service to meet its specified CLR. There, an increase in the buffer space is accommodated by reducing the threshold (i.e. buffer space) for another lower priority class such as a UBR class of an unspecified bit rate. Although the BF value can possibly be manually over-ridden by the network operator, it is not recommended to manually reconfigure the buffer thresholds without approval from equipment vendor. The buffer thresholds are normally configured at the time of manufacturing, on the basis of sophisticated priority based queueing theory; or extensive simulations for complicated weighted fair queue schemes. Therefore, any change of these values should preferably go through all these sophisticated procedures. The BF value is then provided to the reference ECR calculator 13, which also receives from the MIB 2 the Link Capacity (LC) resource parameter, representing the rate at which data units (or cells) are moved out of the buffer through an exit communication link. The reference ECR calculator 13 then calculates the Reference ECR (RECR) value as:

$$RECR=LC/BF$$

and outputs the result to the next stage in the CAC engine 5, i.e. the comparator block 12.

It should be noted that performing a mathematical operation to update the value of BF is not necessary for every call set up, but is rather done on a periodic basis, ranging from hourly to daily. The frequency of updating the BF value is determined by the level of accuracy of the CLR measurement required by the network operator. For more accurate measurements, longer updating intervals are needed, together with more overhead for the measurement from both implementation and operation points of view. For a given accuracy or confidence of measurement, the updating interval is inversely proportional to the outgo link speed. For example, at an E1 rate (2.048 Mbps), a few days are needed in order to observe hundreds of millions of cells for performing the CLR measurement. However, for the OC12 link (622.08 Mbps), a shorter updating interval is needed as thousands of millions cells go through the communication link only in a few hours In general, 10 to 100 cells/CLRs need to be accumulated before gaining confidence in the CLRm value for updating the BF value.

(b) Tuning Factor Block

Figure 4:
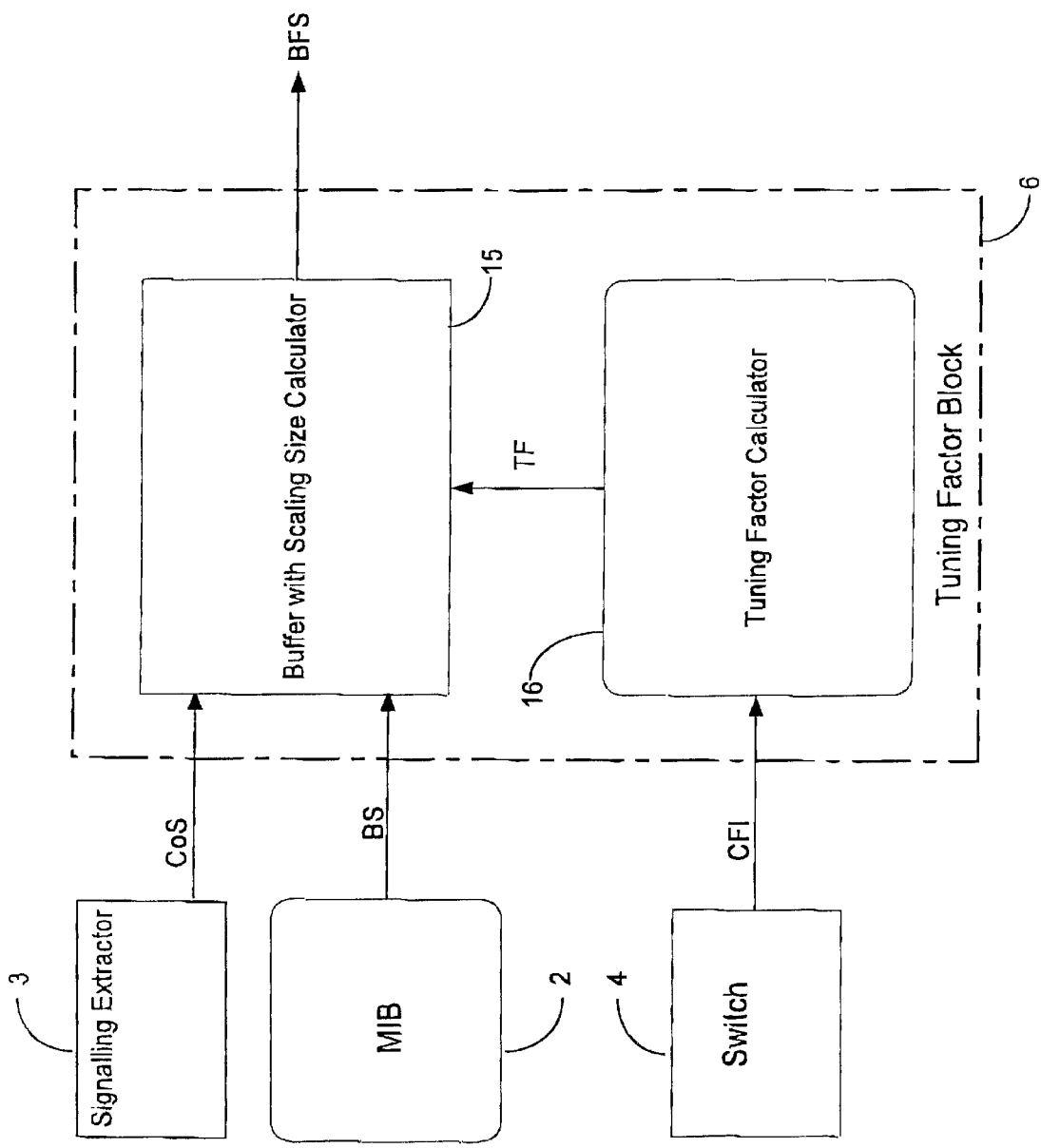
FIG. 4 illustrates, in a block diagram, the tuning factor block shown in FIG. 2.

Further details of the Tuning Factor (TF) block 6 are illustrated in FIG. 4. As indicated above, the TF value is used to adjust the aggressiveness of the calculation. The TF block 6 contains a TF calculator 16, which provides the TF value to a Buffer with Scaling Size (BSS) calculator 15. The BSS calculator 15 fetches the Buffer Size (BS) resource parameter from the MIB 2 and the CoS from the Signaling Extractor 3. The TF calculator 16 fetches from the switch hardware 4 the Cell Flow Information (CFI) and performs statistical measurements thereon to derive from it the Maximum Burst Size (MBS) and the Average Burst Size (ABS) corresponding to a given Class of Service (CoS). The burst size is the ratio of the number of cells over the number of packets. As indicated above, a set of counters for each service class in the switch hardware 4 records both the number of cells and the number of packets entered into the switch during a specified time period The TF calculator 16 then calculates the TF value as:

$$TF=ABS/MBS.$$

The BSS calculator 15 uses the CoS value received from the signaling extractor 3 as a pointer to pick up the TF value corresponding to the CoS of the call in progress. For example, a real-time VBR class has a different value of TF from that of a non-real-time VBR class. The BSS calculator 15 then calculates the value of "Buffer with Factor Scale Size" (BFS):

$$BFS=BS/TF$$

corresponding to the present CoS. This BFS value is provided to the next stage of operation in the CAC engine 5, i.e. the ECR calculator block 9. The purpose of this operation is to minimize the network operator's manual involvement and allow for automatic processing.

(c) Hurst Meter Block

Figure 5:
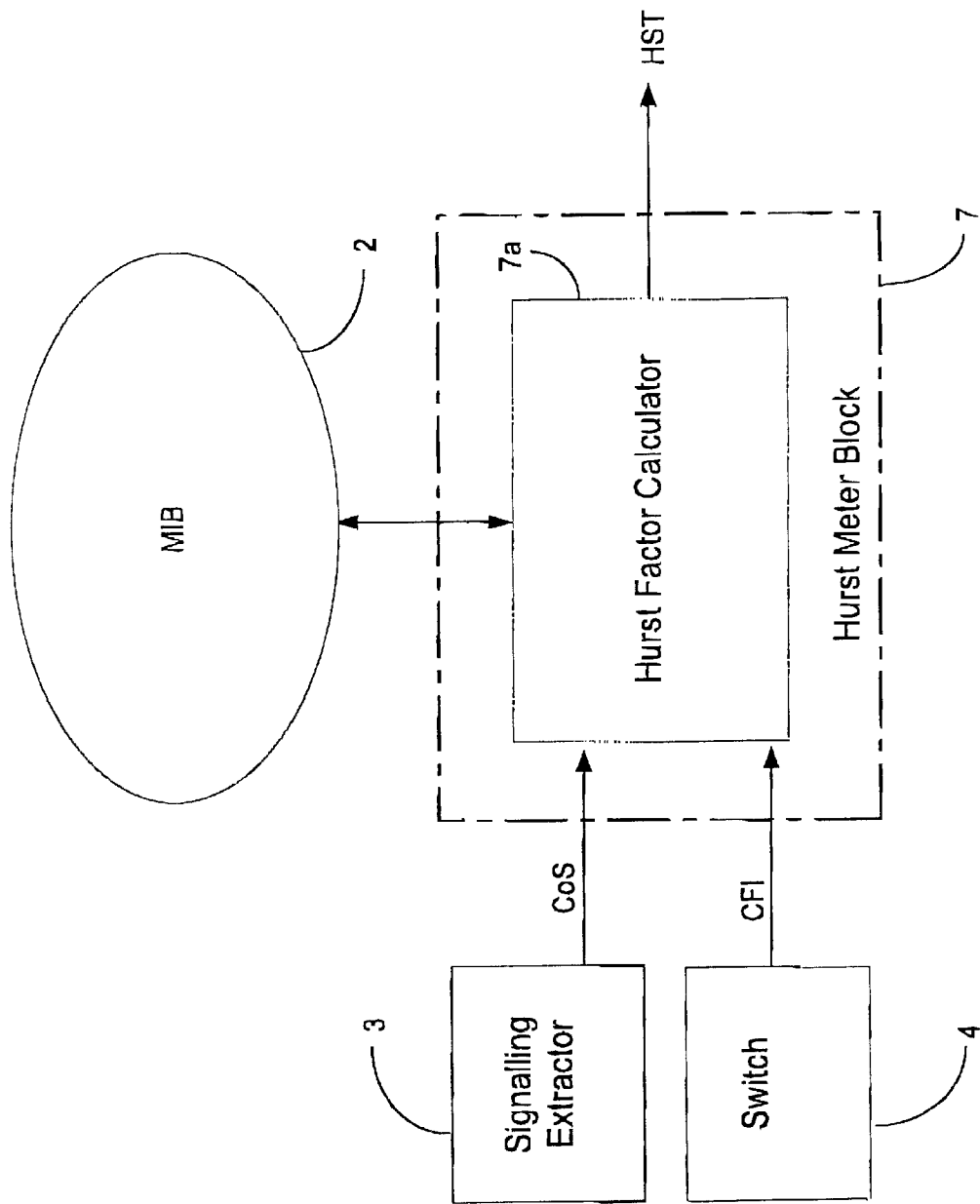
FIG. 5 illustrates, in a block diagram, the Hurst meter block shown in FIG. 2.

As illustrated in FIG. 5, the Hurst meter block 7 fetches the CoS from the signaling extractor 3 and records the CFI from the switch hardware 4. The Hurst meter block 7 contains a Hurst factor calculator 7a which performs statistical measurements on the CFI and sends the number of cells within a specified period for each concerned CoS to the MIB 2 to be recorded therein. A software program/agent residing in the MIB 2 will retrieve these data and calculate the H value when sufficient data is collected by the Hurst meter block 7, and writes back this value into the MIB 2. The value of H is updated regularly within a predefined update interval depending on the required accuracy. Typically, the update interval of H value ranges from 10 to 1000 times the interval of updating the BF value discussed above. The computation of the Hurst value H in the MIB 2 is drawn from the Index of Dispersion for Counts formula known in the art, as provided in reference [2].

The Hurst meter block 7 then obtains from the MNB 2 a Hurst value H corresponding to the given CoS. For example, a real-time VBR class (eg. carrying a video signal with $H=0.85$) has a different value of H from that of non-real-time VBR class (e.g. carrying an email message with $H=0.95$).

Finally, the Hurst factor calculator 7a calculates the HST value (representing the Hurst smoothness of traffic) as:

$$HST = 2 - 2H$$

In a preferred embodiment of this invention, a dedicated hardware is chosen to compute HST. Alternatively, this equation is computed by the software residing in the MIB 2.

(d) ECR Calculator Block

The ECR calculator block 9 shown in FIG. 2 fetches from the signaling extractor 3 the values of the resource parameters PCR, SCR, MBS and CLRs together with the Call_Comes (CC) signal. The ECR calculator block 9 also fetches the BFS value from the TF block 6 and the HST value from the Hurst meter block 7. From these input parameters, the ECR calculator block 9 calculates the of the ECR value for every call set-up request, using either one of the two the formulas derived above, while substituting CLPs for CLR.

(e) ECR Recovery Block

The ECR recovery block 10 receives the Call_Goes (CG) signal from the signaling extractor 3 and retrieves the ECR_Go (ECRG) indication from the MIB 2. From this information the ECR recovery block 10 derives and sends a signal (ECRG') to the accumulator block 11 to update the previous total ECR value when the call is to be released or to recover all interrupted connections upon a link failure.

The process of ECR recovery takes place after one of two conditions:

(a) a normal call releasing operation; and (b) an abnormal link failure (e.g. an optical fibre line is physically cut by accident, or an air link fades due to heavy rain).

Under the former condition, when a call is handed off, the ECR recovery block 10 fetches the ECR value from the MIB 2 based on the call identification obtained from signaling extractor 3, and forwards this ECR value to the accumulator block 11 for subtraction from the TECR value.

Under the latter condition, when a link failure has been indicated by the signaling extractor 3 and a reconnection is requested, the ECR recovery block 10 will respond accordingly to re-establish the connection as follows. When the signaling extractor 3 requests a connection recovery, the ECR recovery block 10 will first check whether or not the connection has an entry in the MIB 2. If not, the ECR recovery block 10 will request the signaling extractor 3 to set up the call as a new comer. If yes, the ECR recovery block 10 will request the accumulator block 11 to provide the same TECR value to the comparator block 12, so that a "go" signal is issued by the comparator block 12. That way, any connection that bas been accepted prior to the link failure, will not be rejected upon recovery from the link failure. In the case that an extended link failure was caused by persistent rain fading, and that a routing part of the data network decided to choose an alternate route, the ECR recovery block 10 will release that link. The ensuing process will be the same as under the formerly mentioned condition of a normal call release.

(f) Accumulator Block

Figure 6:
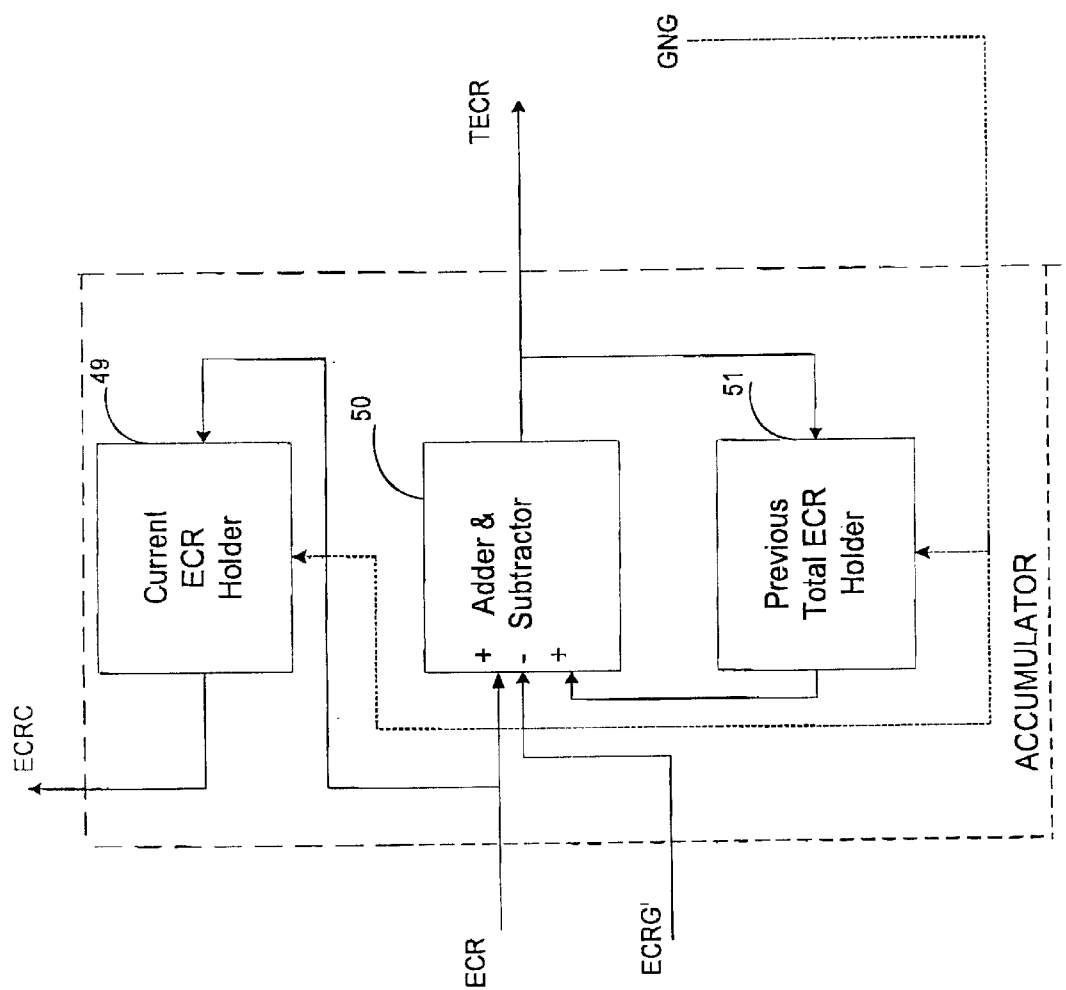
FIG. 6 illustrates in a more detailed block diary, the accumulator block shown in FIG. 2.

The accumulator block 11 keeps track of the total required bandwidth in terms of Total ECR (TECR). A more detailed illustration of this block is given in FIG. 6. The accumulator block 11 contains a current ECR holder 49, an adder/subtractor unit 50, and a previous TECR Holder 51. The adder/subtractor unit 50 is constructed from standard logical gates such as AND, NAND, OR, NOR gates. The Current ECR Holder 49 and the Previous TECR Holder 51 are constructed from standard shift registers, and both receive the Go/No-Go (GNG) signal fed back by the comparator block 12. When a call is accepted, an ECR_Come (ECRC) signal is outputted by the Current ECR Holder 49 to the MIB 2 to be recorded therein for later use, after which the Accumulator 11 is updated. When a call is rejected, this operation is not executed.

The adder/subtractor unit 50 receives the calculated ECR value from the ECR calculator 9, ECRG from the ECR recovery block 10, and the current ECR value from the previous TFCR Holder 51. The adder/subtractor unit 50 provides a TECR output to the next stage of the CAC Engine 5, i.e. the comparator block 12. The newly calculated ECR value is provided as the TECR output value when a call is accepted. Otherwise, the previous TECR value is provided as the TECP output value when a call is rejected.

(g) Comparator Block

The comparator block 12 receives the value of RECR from the BF block 8, the value of TECR from the accumulator block 11, and the Call_Come (CC) signal from the signaling extractor block 3. The comparator block 12 compares the value of TECR representing the required bandwidth, with the value of PECR representing the link capacity divided by the booking factor. If TECR is less than RECR, then the new call is accepted and the previous total ECR is updated. Otherwise the call is rejected and the previous total ECR is not changed.

3. Direct Mathematical Calculation of ECR

As indicated above, the value of ECR is obtained by direct mathematical calculation in one alternative embodiment, and by logarithmic calculation in another alternative embodiment.

Figure 7:
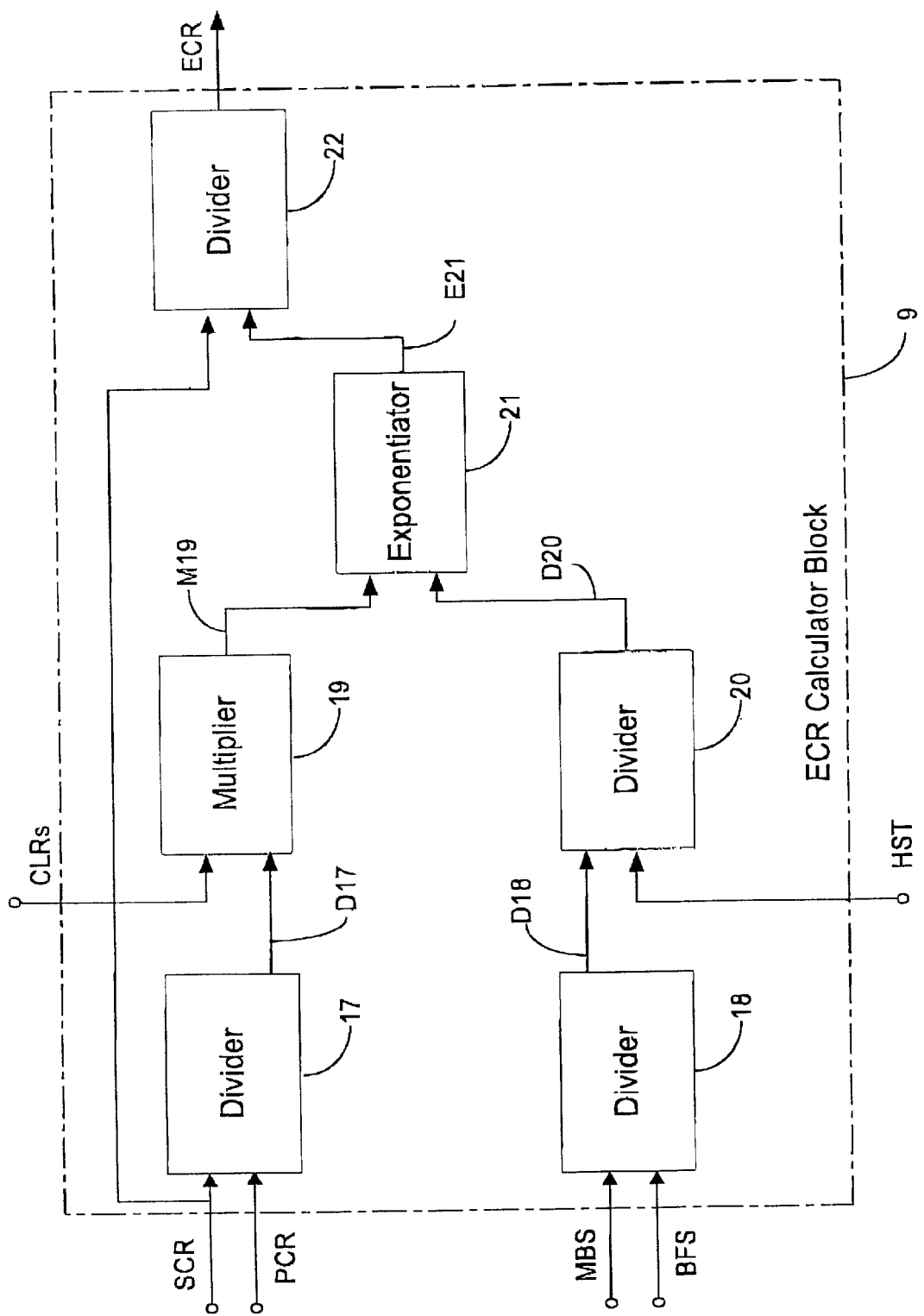
FIG. 7 illustrates, in a block diagram, a hardware configuration for performing direct mathematical operations within he ECR calculator block shown in FIG. 2.

FIG. 7 illustrates details of the ECR calculator block 9 as part of an embodiment of this invention where direct mathematical operations are performed for calculating the value of ECR. In such an embodiment, the ECR calculator block 9 contains first to fourth dividers 17, 18, 20 and 22 respectively, a multiplier 19, and an exponientiator 21.

The inputs to the ECR block 9 are the resource parameters SCR, PCR, CrRs and MBS obtained from the signing extractor block 3, the value of BFS from the TF block 6 and the value of HST from the Hurst meter block 7. The first divider 17 receives the values of SCR and PCR and outputs a first ratio D17 equal to SCR/PCR to the multiplier 19. The multiplier 19 also receives the CLRs parameter and then outputs a multiplication result (CIRs(SCR/PCR)) M19 to the exponentiator 21.

The second divider 18 receives the AMS and BFS values and outputs a second ratio D18 equal to MBS/BFS to the third divider 20. The third divider 20 also receives HST and then outputs the division result D20 equal to (MBS/BFS)/HST to the exponentiator block 21. The exponentiator block 21 then performs the exponential operation of the two inputs received from the multiplier 10 and the third divider 20 to produce an exponent value E21 for $(SCR \times SCR/PCR)^{[(MBS/BFS)/HST]}$, which is provided to the fourth divider 22. The fourth divider 22 also receives the SCR value to generate the ECR value according to the formula derived above and repeated below:

$$ECR = SCR/[CLRs(SCR/PCR)]^{(MBS/BFS)/(HST)}$$

In an alternative exemplary embodiment of this invention, the direct mathematical calculation performed in the ECR calculator block 9 as shown in FIG. 7 is implemented in hardware by using a commercial off the shelf FPGA chip to implement the ECR formula.

4. Logarithmic Calculation of ECR

Figure 8:
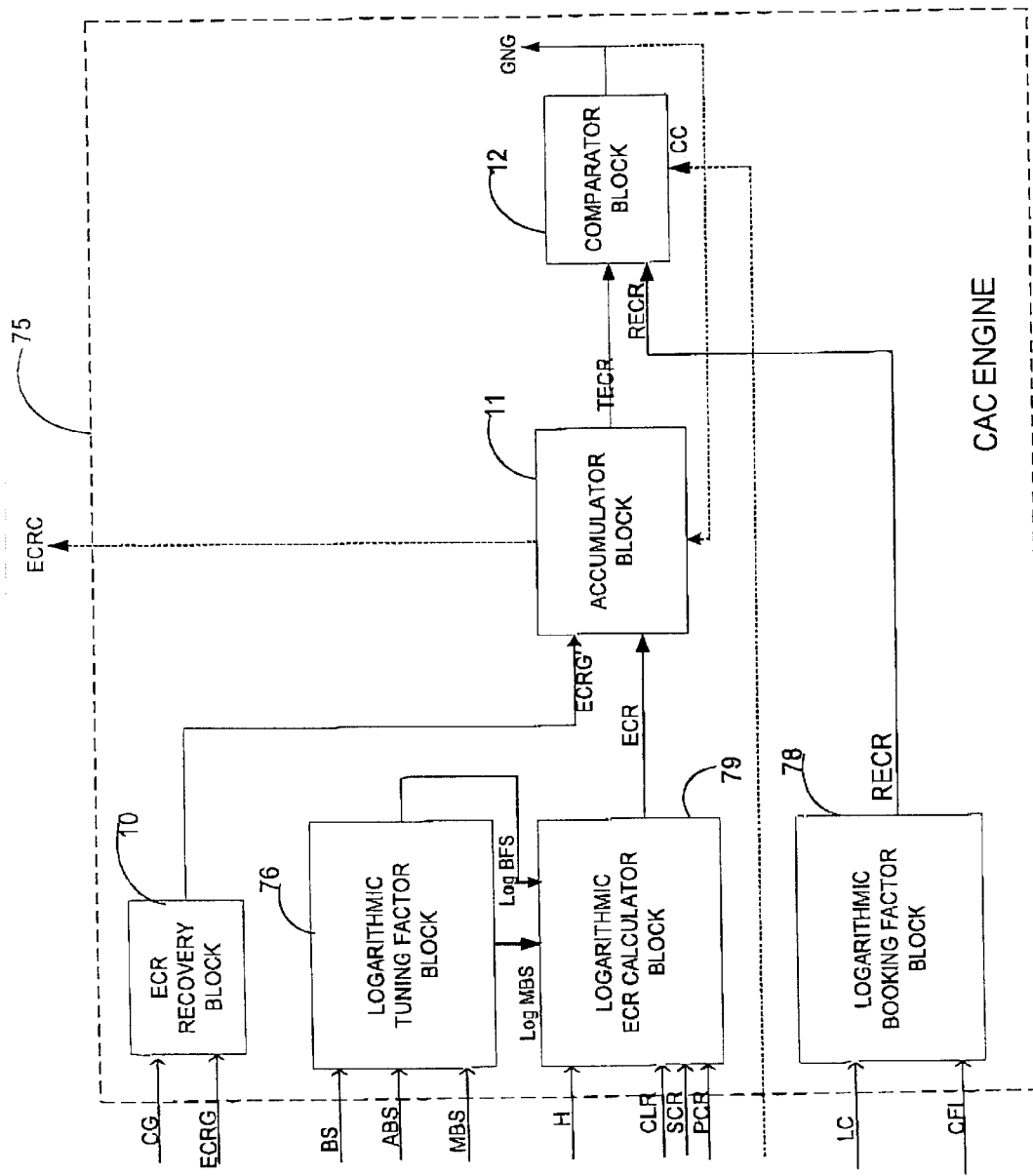
FIG. 8 illustrates, in a block diagram, the composition of the CAC engine in accordance with an alternative embodiment of this invention based on performing log conversion operations.

In a preferred embodiment, only additive/subtractive calculations are performed by using logarithmic operations in order to substantially reduce computation time. FIG. 8 illustrates a configuration of the CAC engine 75 based on performing logarithmic conversion operations. This configuration is similar to that of the CAC engine 5 shown in FIG. 2, except for two differences. First, the TF block 6, the BF block 8 and the ECR calculator block 9 of FIG. 2 are replaced by a logarithmic TF block 76, a logarithmic BF block 78 and a logarithmic ECR calculator block 79. Second, the function of the Hurst meter block 7 of FIG. 2 is embedded in the logarithmic ECR calculator block 79 of FIG. 8.

The following description applies to an exemplary hardware embodiment containing the various blocks shown in FIG. 8. One example of such hardware embodiment is implemented in a Field Programmable Gate Array (FPGA) chip or, alternatively, an Application Specific Integrated Circuit (ASIC) chip. Nevertheless, in alternative embodiments both hardware and software designs are combined for implementing the configuration of FIG. 8.

Figure 9:
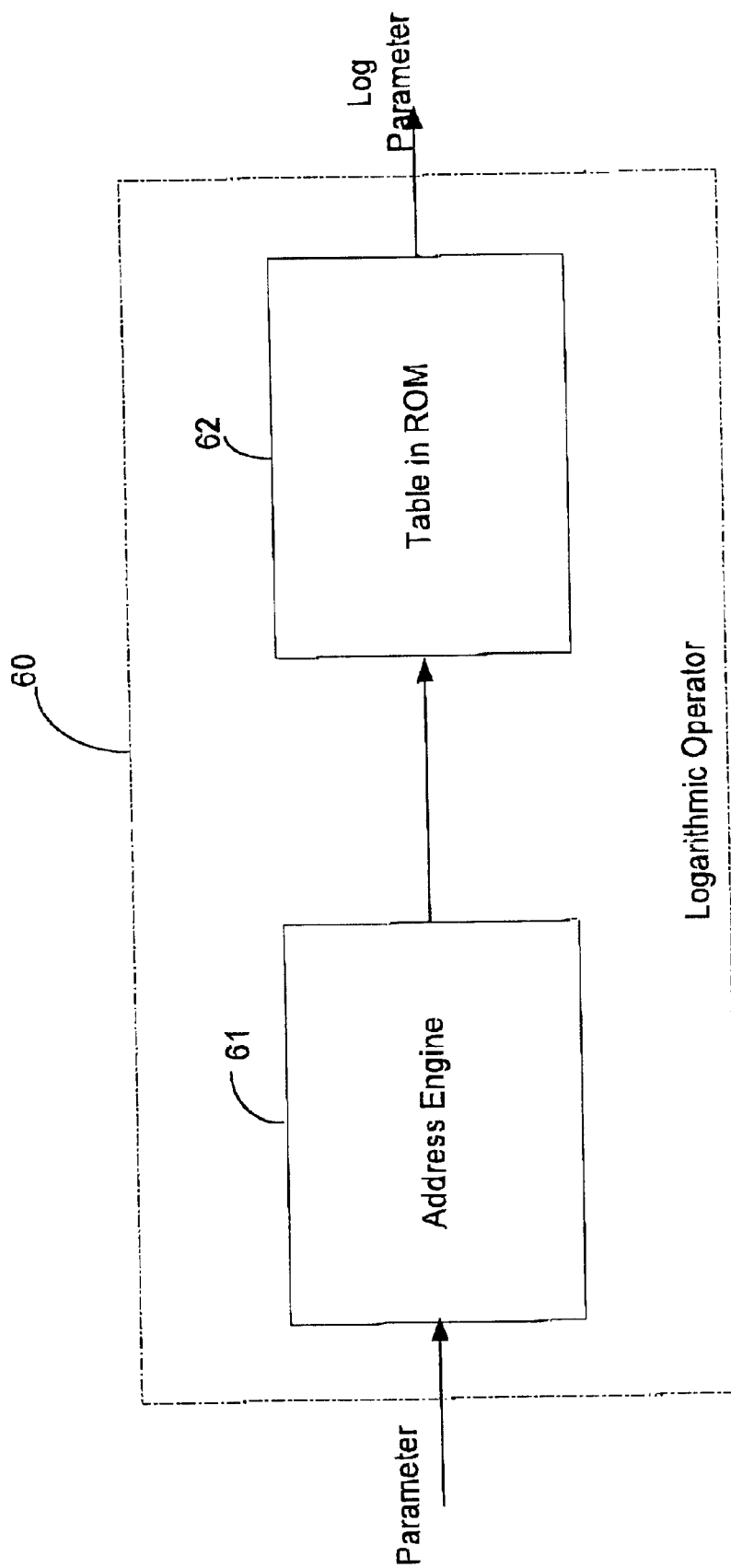
FIG. 9 illustrates, in a block diagram, the log conversion operations performed within each of the logarithmic tuning factor block, logarithmic ECR calculator block, and logarithmic booking factor block of the CAC engine of FIG. 8.

FIG. 9 illustrates a logarithmic operator block 60 used within the CAC Engine 75 of FIG. 8, for performing the log or antilog conversion. The logarithmic operator block 60 contains an address engine 61 followed by a look-up table 62, preferably in the form of a Read-Only Memory (ROM). The address engine 61 receives a parameter value and accordingly addresses the table 62, when performing a log or anti-log conversion. The granularity of the conversion depends on the size of the table, which is designed just big enough to cover the actual operational range and provides the desired accuracy. Typically a size of 1024 bits will provide three effective digits of accuracy, with an expected relative error within 1%, which is sufficient for practical usage. Two types of tables are used: a log table, which is 14 bits per address and a 900-byte (1K) address; and an anti-log table, which is 10 bits per address and a 900-byte (1K) address. In this particular embodiment, the table is preceded by a multiplexer and succeeded by a demultiplexer to permit its sharing by more than one logarithmic operation, as is manifest in FIGS. 10–12.

Figure 10:
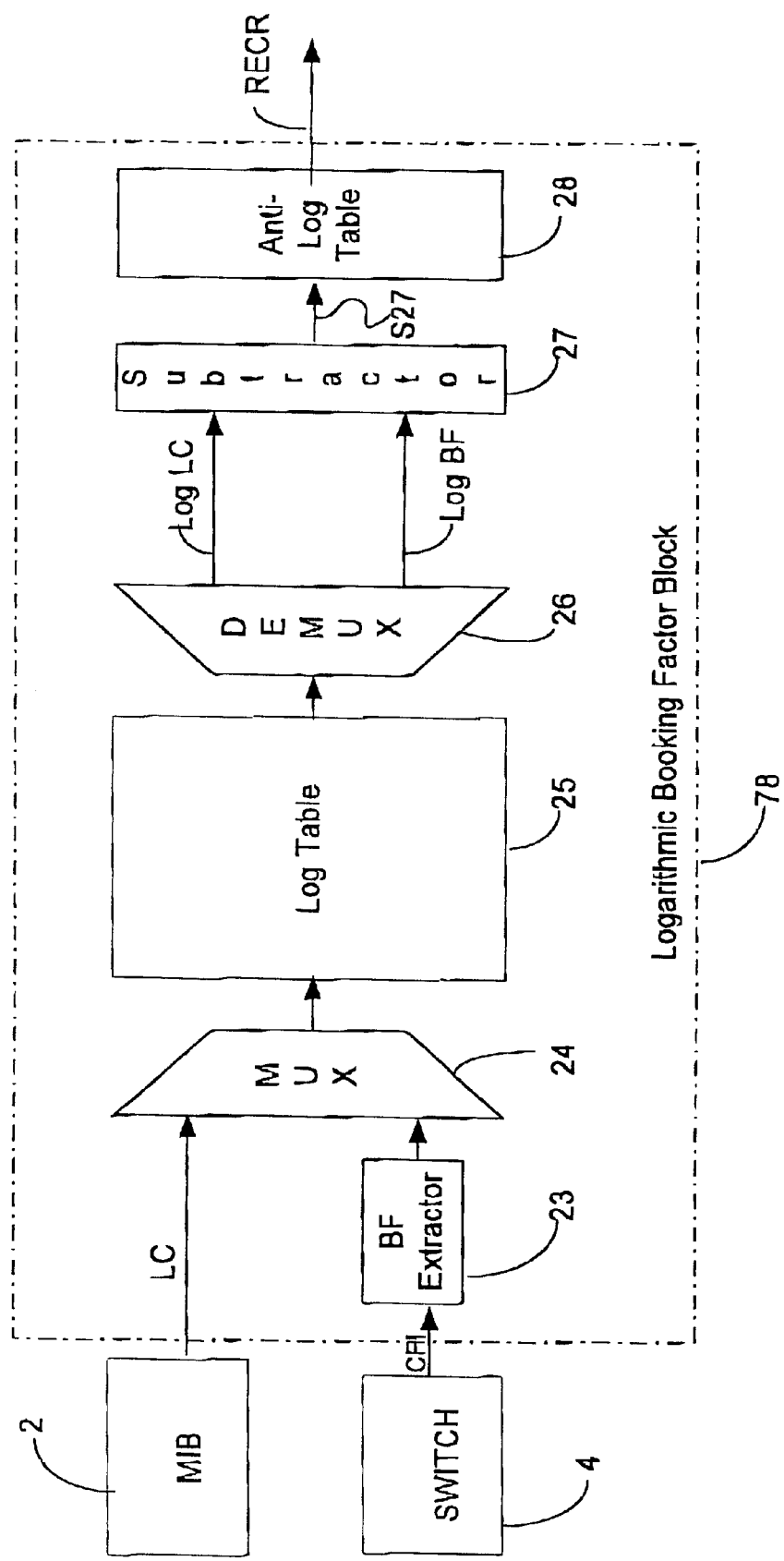
FIG. 10 illustrates in a block diagram, the logarithmic calculations performed within the booking factor block of FIG. 8.

FIG. 10 illustrates the logarithmic BF block 78 shown in FIG. 8. Here, the logarithmic BF block 78 contains in a serial configuration, a BF extractor 23, followed by a multiplexer 24, a log lookup table 25, a de-multiplexer 26, a substractor 27 and an anti-log look-up table 28. The BF extractor 23 extracts the value of RF from the Cell Flow Information (CFI) in the switch hardware 4, and provides such value to the multiplexer 24, which also receives the Link Capacity (LC) value from the MIB 2. The multiplexer 24 multiplexes the values of BF and LC as addresses to the log table 25. The corresponding log values Log LC and Log BF obtained from the log table 25 are then demultiplexed, by the de-multiplexer 26, and provided as inputs to the subtractor 27. The subtractor 27 subtracts these two Log values and outputs the difference S27 as an address to the anti-log Table 28. Finally, the output RECR of the anti-log table 28 is obtained as:

$$RECR = LC/BF$$

Figure 11:
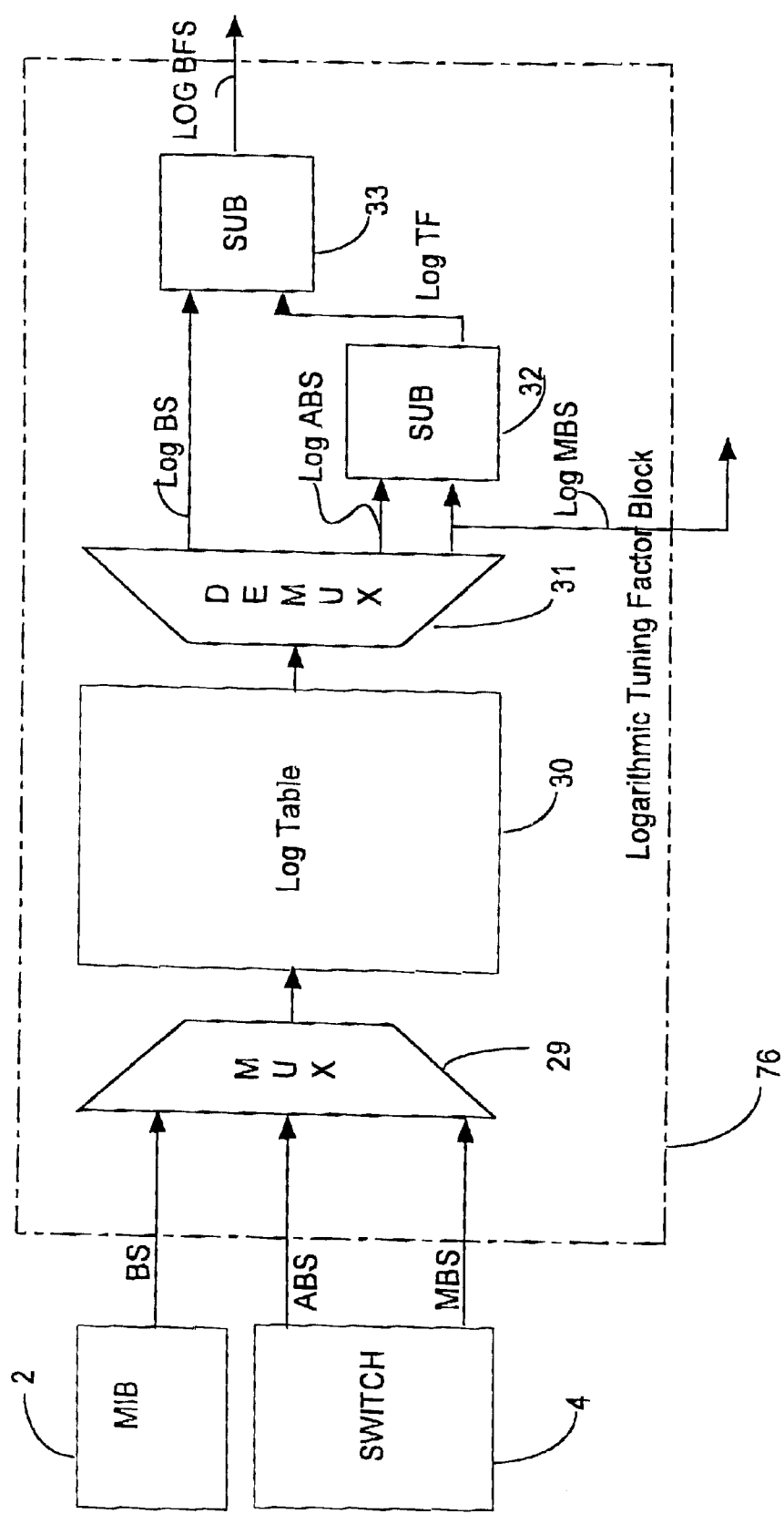
FIG. 11 illustrates, in a block diagram, the logarithmic calculations performed within the tuning factor block of FIG. 8.

FIG. 11 illustrates the logarithmic TF block 76 shown in FIG. 8. Here, the logarithmic TF block 76 contains in a serial configuration, a multiplexer 29, followed by a log look-up table 30, a de-multiplexer 31, a first subtractor 32 and a second subtractor 33. The values of the BS, ABS and MBS parameters are multiplexed by the multiplexer 29 as addresses to the log table 30, which provides corresponding values of Log BS, Log ABS and Log MBS to the demultiplexer 31. The first subtractor 32 receives Log ABS and Log MBS from the demultiplexer 31 to generate:

$$\text{Log} TF = \text{Log } ABS - \text{Log } MBS$$

The second subtractor 33 receives Log BS from the demultiplexer 31 and log TF form the first subtractor 32 to generate:

$$\text{Log } BFS = \text{Log } BS - \text{Log } TF$$

as the final output of the logarithmic TF block 76. Log MBS is also outputted from the logarithmic TF block 76 to the logarithmic ECR calculator block 79.

Figure 12:
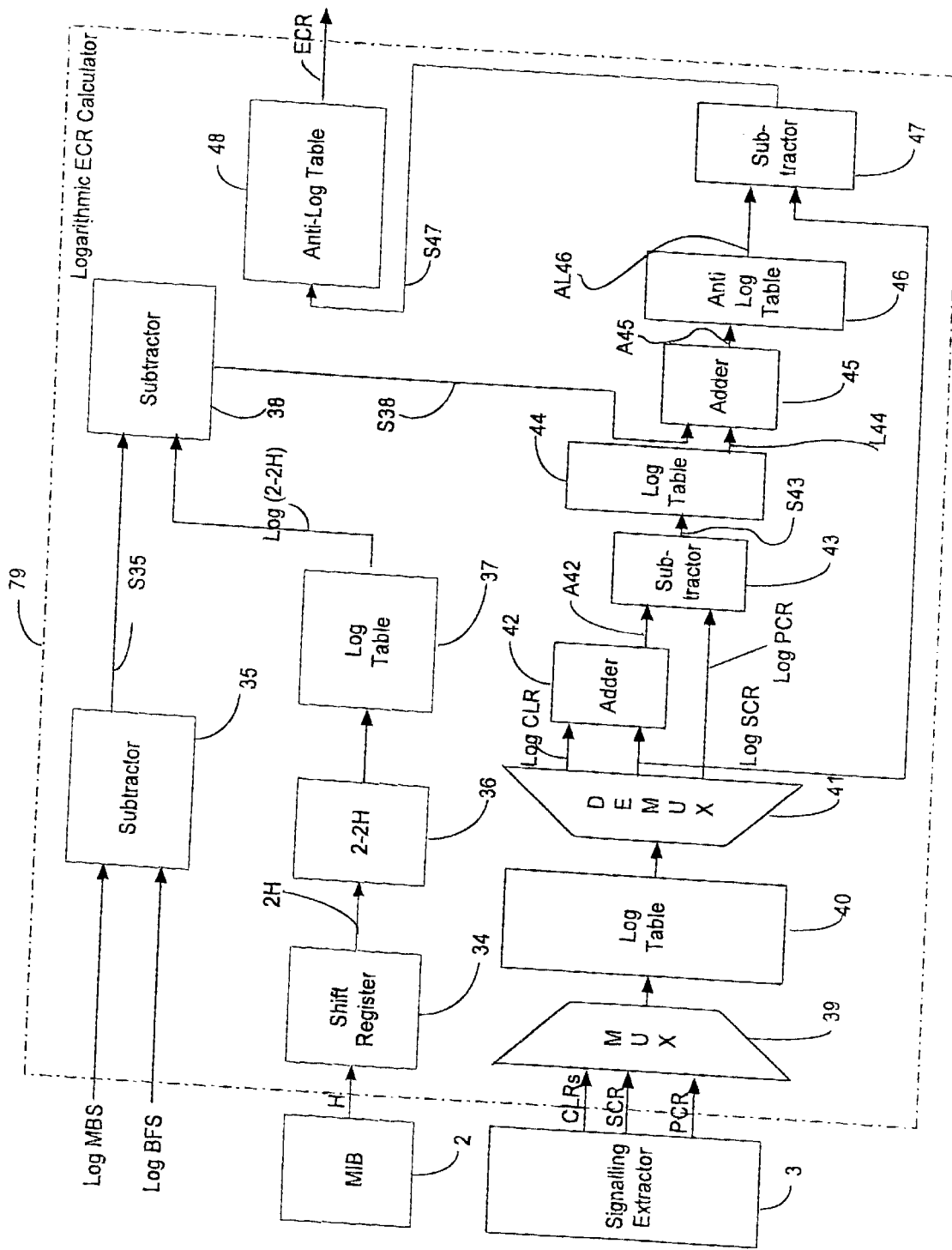
FIG. 12 illustrates, in a block diagram, the logarithmic operations performed within the ECR calculator block of FIG. 8.

FIG. 12 illustrates the logarithmic ECR calculator block 79 shown in FIG. 8. The calculations for:

$$\text{Log}(\text{Exponent}) = \text{Log}[(MBS/(BS/TF)/(2-2H)]$$

are performed by using the Log MBS and Log BFS values obtained from the logarithmic TF block 76 shown in FIG. 11 and the H parameter obtained from the MIB 2.

The logarithmic ECR calculator 79 contains a first subtractor 35, which receives Log MBS and Log BFS to generate a first difference signal S35 (Log MBS−Log BFS), which is fed into a second subtractor 38. A shift register 34 receives the H parameter and feeds the value 2H to an operator unit 36, which performs the basic operation 2−2H. A first Log look-up Table 37 receives this value as an address and provides a corresponding value of Log (2−2H) to the second subtractor 38, which in turn subtracts Log (2−2H) from first difference signal S35 to produce a second difference signal S38 as:

$$\text{Log}(\text{Exponent}) = (\text{Log } MBS - \text{Log } BFS) - \text{Log } HST$$

where HST=2−2H.
The calculations for:

$$\text{Log}(\text{Power}) = [(\text{Log } CLRs + \text{Log } SCR) - \text{Log } PCR] \times \text{Exponent}$$

are then performed by using the values of CLRs, SCR and PCR obtained from the signaling extractor 3 shown in FIG. 2 and the second difference signal S38 obtained from the second subtractor 38. The input parameters CLRs, SCR and PCR are multiplexed by a multiplexer 39 as addresses to a second Log look-up Table 40. The corresponding values of Log CLRs, Log SCR and Log PCR are then demultiplexed by a demultiplexer 41. A first adder 42 receives Log CLRs and Log SCR from the demultiplexer 41 to generate a first addition signal A42 (Log CLRs+Log SCR) fed to a third subtractor 43 together with Log PCR obtained from the demultiplexer 41 to generate a third difference signal S43:

$$\text{Log}(\text{Base}) = (\text{Log } CLRs + \text{Log } SCR) - \text{Log } PCR$$

The third difference signal S43 is fed as an address to a third Log Look-up Table 44 to generate signal L44 which is representative of $$\text{Log}(\text{Log }(\text{Base})) = \text{Log}[(\text{Log } CLRs + \text{Log } SCR) - \text{Log } PCR].$$

L44 is fed together with the second difference signal S38 to a second adder 45 to generate a second addition signal A45:

$$\text{Log}(\text{Log}(\text{Base})) + \text{Log}(\text{Exponent}) = \text{Log }[(\text{Log } CLRs + \text{Log } SCR) - \text{Log } PCR] + [(\text{Log } MBS - \text{Log } BFS) - \text{Log } HST]$$

The second addition signal A45 is then inputted as an address to a first Anti Log Look-up Table 46 to generate a first anti-log signal AL46:

$$\text{Log(power)}=[(\text{Log } CLRs + \text{Log } SCR) - \text{Log } PCR] \times \text{Exponent}$$

where Exponent=[MBS/(BS/TF)]/(2−2H).

A fourth subtractor 47 receives this first anti-log signal AL46 and Log SCR obtained from the demultiplexer 41, to generate a fourth subtraction signal S47:

$$\text{Log } ECR = \text{Log } SCR - [(\text{Log } CLRS + \text{Log } SCR) - \text{Log } PCR] \times \text{Exponent}$$

This signal is fed as an address to a second anti-Log look-up table 48 to generate ECR in terms of the final expression:

$$ECR = SCR/[CLRs(SCR/PCR)]^{(MBS/(BS/TF))/(2-2H)}$$

5. Other Embodiments

Of course, numerous variations and adaptations may be made to the particular embodiments of the invention described above, without departing from the spirit and scope of the invention, which is defined in the claims.

The design of the CAC engine of the present invention is also tailored for use in other broadband ISDN networks, such as Virtual Satellite Networks (VSN) and Low-Earth-Orbiting (LEO) satellites. In the case of VCN, a random early call rejection scheme is used when there is sharing between networks. A call will be rejected according to a certain probability that varies with the total system load, as described in reference [6]. In the case of LEO satellites, the hardware CAC embodiment of the present invention is used. At the first call set-up time, the ECR value is recorded in a table for the hand-over process in the MIB 2.

6. Comparison between Software and Hardware Implementations

The longest signal path in a hardware design is from the MBS input at the TF block 6 to the output of the ECR calculator block 9 (see FIGS. 2 and 8). To complete all of the computations of this path, using a regular 100 MHz clock rate of a standard FPGA board, a maximum of 12 clocks are required. This means that only 120 ns are consumed per call. With 3 digits of accuracy provided by current FPGA technology, we found (based on the Altera™ 10K FPGA specification) that 2400 gates are needed to implement the Log/Anti-Log look-up Tables and 1600 gates are needed to implement the logic units, yielding a total gate count of only 4000.

In a software implementation on the other hand, we found that, by choosing a very fast 40 MHz real-time software computation (such as the Vx Works™ by WindRiver™), 15 ticks are needed to perform 1,000,000 mathematical operations, where each tick consumes 1/60 seconds. This means that eight mathematical operations will require 2 micro seconds to complete the software computation for the ECR equation. This does not include the comparison function and memory read/write times, which consume more than the computation time itself.

It is therefore concluded that the hardware implementation of the ECR formula, based on pure additive computations, will be executed by approximately two orders of magnitude faster than a software implementation.

7. Comparative Analysis with Prior Art CACs

Analytical results of an embodiment of the Present CAC invention (PCAC) are compared with those of two prior art CACs: an IBM™ CAC (ICAC) based on the M/M/1 queue algorithm described in reference [1] and a VTT™ CAC (VCAC) based on the FBM/M/1 queue algorithm described in reference [3].

Table 1 compares the number of arithmetic computations required by each of the above CAC algorithms. From this table it is seen that the present CAC embodiment has considerably less computations than the other two.

Using a standard Belcore™ traffic test set for three different Variable Bit Rate models (VBRI, VBRII, VBRIII), Table 2 compares the ECR values required by each of the above CAC algorithms. This table shows that the ECR values obtained by the three different CAC methods are quite close, and therefore indicates that the present CAC invention is just as efficient as the other two relatively more complex algorithms.

When several service categories are to be supported, additional information will need to be stored in the MIB. For the switch used in the above comparative analyses, the network may support five service categories and eight distinct priorities, as given in Table 3. Buffer size, cell loss ratio and Link Speed will also need to be individually fetched from the MIB, as shown in Table 4. Table 4 shows the priority numbers for traffic in a presently preferred embodiment. Continuous bit rate (CBR) traffic from a CBR source is assigned priority 1. Priority 2 is assigned to Real-Time Variable Bit Rate 1 (RTVBR1) class traffic from VBRI and VBRII sources. Priority 3 is assigned to Real-Time Variable Bit Rate 2 (RTVBR2) class traffic from VBRI and VBRII sources. Priorities 4, 5 and 6 are given to Non-Real-Time Variable Bit Rate 1, 2, and 3 (NRTVBR1, NRTVBR2, NRTVBR3) classes of traffic respectively, from VBRI and VBRIII sources. Priority 7 is given to Guaranteed Frame Rate (GFR) class traffic from Transmission Control Protocol (TCP) sources. Priority 8 is given to Unspecified Bit Rate (UBR) traffic from User Datagram Protocol (UDP) sources.

8. Simulation Procedures (a) Procedure for Theoretical Simulation

The general procedure is to simulate a single First-In-First-Out (FIFO) queue using a given homogeneous input signal, find the Cell Loss Ratio (CLR), and compare this loss with that of the analytic derivation. The CLR value for the analytic derivation is given by the formula:

$$CLR = \text{load}^{(BS \times 3H)}$$

where J=(2−2H)/3−2H).

Figure 13:
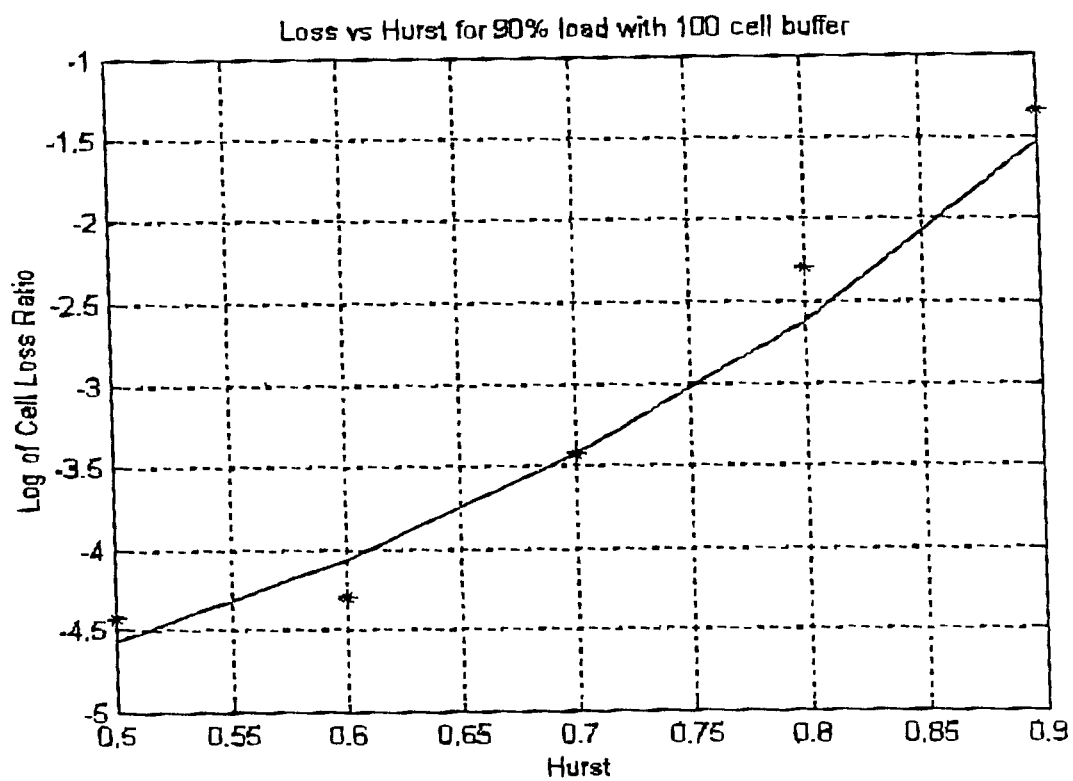
FIG. 13 compares in a graph the relationship between CLR and Hurst obtained from simulated results versus analytic results.

Simulation for a load=0.9 and BS=100 using the techniques described in reference [7], was obtained as shown in Table 5 and graphically shown in FIG. 13.

(b) Procedure for Benchmark Simulation

The general procedure is to simulate a single FIFO queue using a given homogeneous input signal, find the cell loss curve, and compare this loss with that of the analytic derivation. The cell loss for the analytic derivation is given by the formula:

$$CLR = \frac{TF1 \times PCR}{SCR} \times \left(\frac{BF \times SCR}{EB}\right)^{\left(\frac{TF2 \times MBS}{BS}\right)^{TF2 \times (2H-1)-1}}$$

where the tuning factor values TF1, TF2, and TF3, and the Hurst value H are chosen for different service categories, as shown below. For the simulation, a link speed of 155 Mb/s, a T1 CBR and a DS-3 VBR are assumed, and the sources (bit-rate models) are varied in order that the load varies from 0.6, 0.7, 0.8, until 0.9.

For the CBR service category a Bellcore CBR model is used as source to tune the three tuning factors, starting with centre values of:

TF1=0.1, TF2=1, TF3=1

For the RT-VBR service category, a Bellcore VBR model is used as source to tune the tuning factors, starting with the centre values of:

TF1=0.2, TF2=0.5, TF3=0.7

Furthermore, based on the FBM model, the default traffic parameter "H" is tuned by using average values of existing measurements, starting with the centre value of:

H=0.7

For the NRT-VBR service category, a Bellcore VBR model is used as source to tune the three tuning factors, starting with the centre values of:

TF1=0.25, TF2=0.2, TF3=0.7

Moreover, based on a WWW model, the default traffic parameter "H" is tuned by using average values of existing measurements, starting with the centre value of:

H=0.8

For the GFR/ABR service category, a Poisson model (as a TCP model) is used as source to tune the three tuning factors, starting with the centre values of:

TF1=0.3, TF1=1, TF3=1

For the UBR service category, a Poisson (or Pare to Modulated General Process) model is used as source to tune the default ECR parameter, starting with a centre value of:

ECR=10 cells/sec (c) Real Simulation

Figure 14:
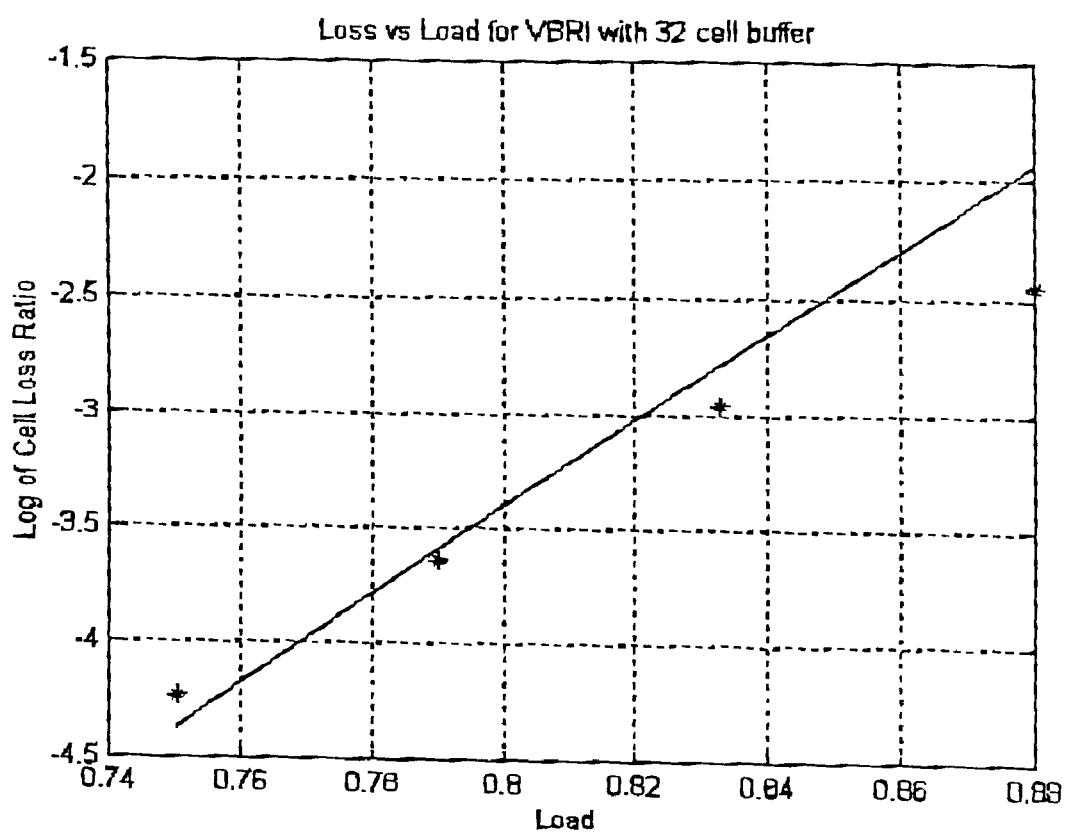
FIG. 14 illustrates in a graph the values of CLR versus Load performance obtained from real simulation results.

The general procedure is to stimulate a switch using a given heterogeneous input signal, find the CLR, and fine-tune the factors. An example of this procedure is described in reference [7]. One result of this simulation process is graphically shown in FIG. 14.

TABLE 1

| CAC Algorithms | Number of Mathematical Operations | | | Total Number of Computations |
|---|---|---|---|---|
| | "+, −" | "×, ÷" | Power | |
| PCAC | 0 | 7 | 1 | 8 |
| ICAC | 8 | 17 | 5 | 30 |
| VCAC | 1 | 19 | 7 | 27 |

TABLE 2

| | ECR (cells/sec) | | |
|---|---|---|---|
| CAC Algorithms | VBRI Model | VBRII Model | VBRIII(H) Model |
| PCAC | 5198 | 736 | 10079 |
| ICAC | 5271 | 727 | NA |
| VCAC | NA | NA | 10786 |

TABLE 3

| Priority Number | Service Category | Buffered? | Back pressured? |
|---|---|---|---|
| 1 | CBR | N | N |
| 2 | RT-VBR | N | N |
| 3 | | N | N |
| 4 | NRT-VBR | N | N |
| 5 | | Y | N |
| 6 | | Y | Y |
| 7 | ABR | Y | Y |
| 8 | UBR | Y | Y |

TABLE 4

| Priority Number | Service Category | Source | QoS | Buffer Size F | Buffer Size I/E | ECR/SCR F | ECR/SCR I/E | Fabric CAC |
|---|---|---|---|---|---|---|---|---|
| 1 | CBR | CBR | $10^{-10}$ | 32 | 128 | 1.6 | 1.05 | Y |
| 2 | RTVBR1 | VBRI | $10^{-9}$ | 32 | 128 | 21.9 | 15.7 | Y |
| | | VBRII | | 32 | 128 | 123 | 45 | Y |
| 3 | RTVBR2 | VBRI | $10^{-9}$ | 32 | 512 | 21.9 | 2.6 | Y |
| | | VBRII | | 32 | 512 | 123 | 1.54 | |
| 4 | NRT-VBR1 | VBRI | $10^{-7}$ | 32 | 1712 | 21.3 | 1.22 | Y |
| | | VBRIII | | 32 | 1712 | 12.6 | 2.82 | |
| 5 | NRT-VBR2 | VBRI | $10^{-6}$ | 32 | 1712 | 20.8 | 1.2 | Y |
| | | VBRIII | | 32 | 1712 | 12.6 | 2.4 | |
| 6 | NRT-VBR3 | VBRI | $10^{-5}$ | 32 | 1712 | 20.2 | 1.17 | N |
| | | VBRIII | | 32 | 1712 | 12.5 | 2.1 | |
| 7 | GFR | TCP | $10^{-6}$ | | | | | N |
| 8 | UBR | UDP | $10^{-4}$ | | | | | N |

TABLE 5

| Hurst Parameter | CLR Simulated | CLR Analyzed |
|---|---|---|
| 0.5 | 3.8E-5 | 2.7E-5 |
| 0.6 | 5.1E-5 | 8.6E-5 |
| 0.7 | 3.7E-4 | 3.7E-4 |
| 0.8 | 5.1E-3 | 2.4E-3 |
| 0.9 | 4.6E-2 | 3.0E-2 |

What is claimed is:

1. A Call Admission Control (CAC) system for use within a data network for accepting or rejecting new calls in the data network, said system comprising:
   a) a signaling extractor for periodically obtaining data flow information from said data network including parameter values representative of network resource parameters including a buffer size (BS), a peak cell rate (PCR), a sustainable cell rate (SCR), and a user specified Cell Loss Ratio (CLRs), each parameter value associated with a class of service;
   b) a Hurst meter block for determining a Hurst parameter (H) value from the data flow information based on the class of service;
   c) a tuning factor block for determining a Tuning Factor (TF) value from the data flow information;
   d) an effective cell rate (ECR) calculator block responsive to the Hurst meter block and the tuning factor block for extracting a Maximum Burst Size (MBS) value from the data flow information and determining an Effective Cell Rate (ECR) value equal to $$SCR/[CLRs\ (SCR/PCR)]^{MBS/(BS/TF)/(2-2H)};$$

e) an accumulator block responsive to the ECR calculator block for estimating required a Total Effective Cell Rate (TECR) value and for updating the TECR value when a new call is accepted;

f) a booking factor (BF) block for determining a Reference Effective Cell Rate (RECR) value from the data flow information and the parameter values; and g) a comparator block responsive to the accumulator block and the BF block for comparing the values of TECR and RECR and providing a go-no-go signal indicating that the new call is to be accepted when TECR<RECR, and that the new call is to be rejected otherwise.

2. A CAC system as in claim 1, wherein the ECR calculator block includes a multiplier, an exponentiator and a plurality of dividers connected to each other for receiving SCR, CLRs, PCR, MBS, BS, TF and H values, and for calculating the ECR value.

3. A CAC system as in claim 1, wherein the ECR calculator block includes logarithmic calculating means for calculating the ECR value through logarithmic operations using the formula:

$$\text{Log } ECR = \text{Log } SCR - [\text{Log } CLR + \text{Log } SCR - \text{Log } PCR] \times \text{Exponent}$$

where Exponent=[MBS/(BS/TF)]/(2−2H).

4. A CAC system as in claim 3, wherein the logarithmic calculating means includes a log table, a plurality of subtractors and adders and an anti-log table connected to each other for receiving logarithmic SCR, CLRs, PCR, MBS, BS, TF and H values and for calculating the ECR value.

5. A CAC system as in claim 4, wherein the log table is preceded by a multiplexer and succeeded by a demultiplexer to permit sharing of said table among a plurality of logarithmic operations.

6. A CAC system as in claim 1, wherein the set of resource parameters includes link capacity (LC), and wherein the BF block determines the RECR value by setting a booking factor (BF) value, and calculating RECR as LC/BF.

7. A CAC system as in claim 6, wherein the BF block includes a measured cell loss ratio (CLRm) block for deriving a measured Cell Loss Ratio (CLRm) value by dividing the number of discarded cells by the number of transferred cells, and for comparing the CLRm and the CLRs, and for decreasing BF CLRm<CLRs, and increasing BF when CLRm>CLRs.

8. A CAC system as in claim 7, wherein the BF block sets a predetermined upper bound for the BF value such that when the BF value reaches the upper bound, an incremental increase in buffer threshold is effected for said class of service.

9. A CAC system as in claim 1, wherein the TF block includes means for determining the TF value by deriving an Average Burst Size (ABS) value and extracting a Maximum Burst Size (MBS) value from the data flow information based on the class of service, and means for calculating the TF value as ABS/MBS for each applicable class of service.

10. A CAC system as in claim 1, wherein the Hurst meter block sets the value of H to 0.5 for non-self similar traffic.

11. A CAC system as in claim 1, wherein the accumulator block estimates the TECR value by keeping track of calls released and calls to be accepted by the data network.

12. A CAC system as in claim 11, further comprising an ECR recovery block for updating the TECR value within the accumulator block upon recovery from an interrupted connection.

13. A method of Call Admission Control (CAC) within a data network for a new call having a class of service, where a data network data flow in the data network is characterized by network resource parameters including buffer size (BS), peak cell rate (PCR), sustainable cell rate (SCR), and user specified Cell Loss Ratio (CLRs) corresponding to the class of service, said method comprising the steps of:

a) determining a Hurst parameter (H) value from the data network data flow;

b) determining a Tuning Factor (TF) value from the data network data flow;

c) determining an Effective Cell Rate (ECR) value by determining a Maximum Burst Size (MBS) value from the data network flow and utilizing the determined Hurst parameter, tuning factor and maximum burst size to calculate an-ECR value as $SCR/[CLRs\,(SCR/PCR)]^{MBS/(BS/TF)/(2-2H)}$;

d) estimating a required Total Effective Cell Rate (TECR) value;

e) determining a Reference Effective Cell Rate (RECR) value;

f) accepting the new call if TECR<RECR, and rejecting the new call otherwise; and g) updating the value of TECR when the new call is accepted.

14. A method of CAC as in claim 13, wherein the H value is determined from the class of service and data flow information.

15. A method of CAC as in claim 13, wherein the step of determining the ECR value is performed using logarithmic operations, such that Log ECR is calculated as $$\text{Log } SCR - [\text{Log } CLR + \text{Log } SCR - \text{Log } PCR] \times \text{Exponent}$$

where Exponent=[MBS/(BS/TF)]/(2−2H).

16. A method of CAC as in claim 13, wherein the set of resource parameters includes link capacity (LC) and user specified Cell Loss Ratio (CLRs), and wherein the step of determining the RECR value includes the steps of:

(i) setting a booking factor (BF) value; and (ii) calculating RECR as LC/BF.

17. A method of CAC as in claim 16, wherein the step of setting the BF value includes the steps of:

(i) deriving from the data flow information a measured Cell Loss Ratio (CLRm) value by dividing the number of discarded cells by the number of transferred cells; and (ii) decreasing the BF value when CLRM<CLRs, and increasing the BF value when CLRm>CLRs.

18. A method of CAC as in claim 17, wherein a predetermined upper bound is set for the BF value such that when the BF value reaches the upper bound, an incremental increase in buffer threshold is effected for said class of service.

19. A method of CAC as in claim 13, wherein the step of determining the TF value includes the steps of:

(i) deriving an Average Burst Size (ABS) value from the data flow information based on the class of service; and (ii) calculating the TF value as ABS/MBS for each applicable class of service.

20. A method of CAC as in claim 13, wherein the value of H is set to 0.5 for non-self similar traffic.

21. A method of CAC as in claim 13, wherein the step of estimating TECR is performed by keeping track of calls released and calls to be accepted by the data network.

22. A method of CAC as in claim 21, wherein the TECR value is updated upon recovery from an interrupted connection.

* * * * *